United States Patent
Petrova et al.

(10) Patent No.: US 10,776,904 B2
(45) Date of Patent: Sep. 15, 2020

(54) METHOD AND APPARATUS FOR PROCESSING IMAGE

(71) Applicant: SAMSUNG ELECTRONICS CO., LTD., Suwon-si (KR)

(72) Inventors: Xenya Yurievna Petrova, St.-Petersburg (RU); Ivan Victorovich Glazistov, Ulyanovsk region (RU); Sergey Stanislavovich Zavalishin, Moscow (RU); Vladimir Gennadievich Kurmanov, Bryanskaya region (RU); Kirill Victorovich Lebedev, Novgorod (RU); Gleb Sergeevich Milyukov, Moscow (RU); Alexander Alexandrovich Molchanov, Moscow (RU); Andrey Yurievich Shcherbinin, Moscow (RU); Ilya Vasilievich Kurilin, Novosibirsk (RU)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 202 days.

(21) Appl. No.: 15/970,617

(22) Filed: May 3, 2018

(65) Prior Publication Data

US 2018/0322614 A1    Nov. 8, 2018

(30) Foreign Application Priority Data

May 3, 2017  (RU) ................................ 2017115447
Apr. 12, 2018  (KR) ........................ 10-2018-0042920

(51) Int. Cl.
G06K 9/00    (2006.01)
G06T 3/40    (2006.01)
(Continued)

(52) U.S. Cl.
CPC ............ *G06T 3/4076* (2013.01); *G06T 5/002* (2013.01); *G06T 5/20* (2013.01); *G06T 5/50* (2013.01);
(Continued)

(58) Field of Classification Search
CPC combination set(s) only.
See application file for complete search history.

(56) References Cited

U.S. PATENT DOCUMENTS 5,535,291 A    7/1996  Spencer et al.
6,766,067 B2   7/2004  Freeman et al.
(Continued)

FOREIGN PATENT DOCUMENTS

CN    103179325 A    6/2013
JP    2006-197455 A  7/2006
(Continued)

OTHER PUBLICATIONS

Liu, Automated macular pathology diagnosis in retinal OCT images using multi-scale spatial pyramid and local binary patterns in texture and shape encoding, Jun. 2011, Elsevier (Year: 2011).*
(Continued)

*Primary Examiner* — Alex Kok S Liew
(74) *Attorney, Agent, or Firm* — Sughrue Mion, PLLC

(57) ABSTRACT

An approach is provided to process an image. The approach includes: obtaining a pixel shift set indicating information of movement of a plurality of pixels included in coinciding portions among a plurality of low-resolution images with respect to a single scene; dividing the pixel shift set into an integer portion and a fractional portion; generating an integer pixel shift set and a fractional pixel shift set; selecting a filter set corresponding to the plurality of pixels from among a plurality of pre-stored filter sets including a filter weight value applied to the pixels; and obtaining a high-resolution
(Continued)

image with respect to the single scene, based on the plurality of low-resolution images, the selected filter set, and the integer pixel shift set.

18 Claims, 10 Drawing Sheets

(51) Int. Cl.
  *G06T 5/00* (2006.01)
  *G06T 5/20* (2006.01)
  *G06T 7/49* (2017.01)
  *G06T 7/246* (2017.01)
  *G06T 5/50* (2006.01)

(52) U.S. Cl.
  CPC ............... *G06T 7/246* (2017.01); *G06T 7/49* (2017.01); *G06T 2207/20024* (2013.01)

(56) References Cited

U.S. PATENT DOCUMENTS

| | | | |
|---|---|---|---|
| 9,282,253 B2 | 3/2016 | Amitay et al. | |
| 2002/0097324 A1* | 7/2002 | Onuki | H04N 5/23287 348/208.99 |
| 2006/0159369 A1* | 7/2006 | Young | G06T 3/4069 382/299 |
| 2010/0097491 A1* | 4/2010 | Farina | H04N 9/045 348/223.1 |
| 2011/0128403 A1* | 6/2011 | Easwar | G06T 9/007 348/222.1 |
| 2012/0249727 A1 | 10/2012 | Corcoran et al. | |
| 2013/0064474 A1 | 3/2013 | Maslov et al. | |
| 2015/0339803 A1 | 11/2015 | Waqas et al. | |
| 2016/0125575 A1 | 5/2016 | Takahashi et al. | |

FOREIGN PATENT DOCUMENTS

| | | |
|---|---|---|
| JP | 2009-21756 A | 1/2009 |
| JP | 2010-93474 A | 4/2010 |
| RU | 2010 115 022 A | 10/2011 |
| RU | 2 583 725 C1 | 5/2016 |

OTHER PUBLICATIONS

Communication from Federal Institute of Industrial Property of the Federal Service on Industrial Property, Patent and Trade Marks in Russian Patent Application No. 2017115447, dated Dec. 25, 2017.

* cited by examiner

FIG. 4
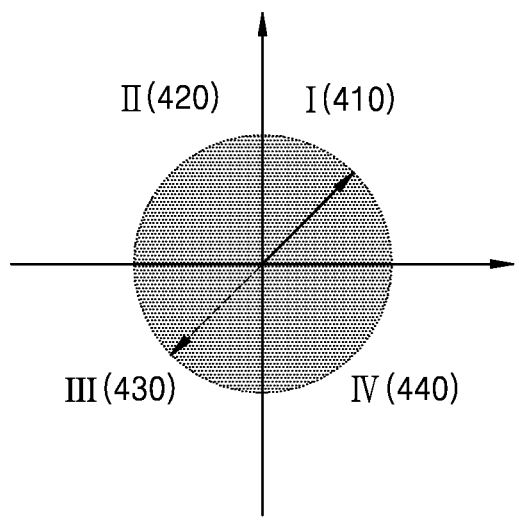
FIG. 5
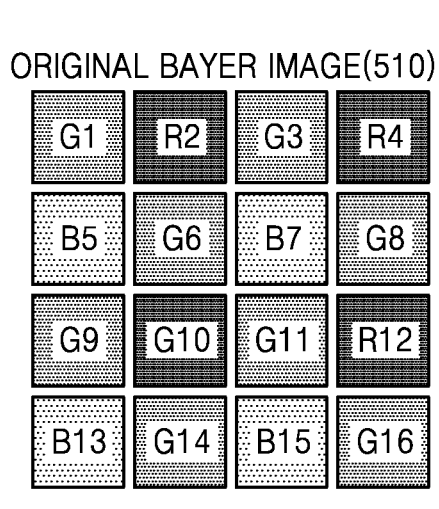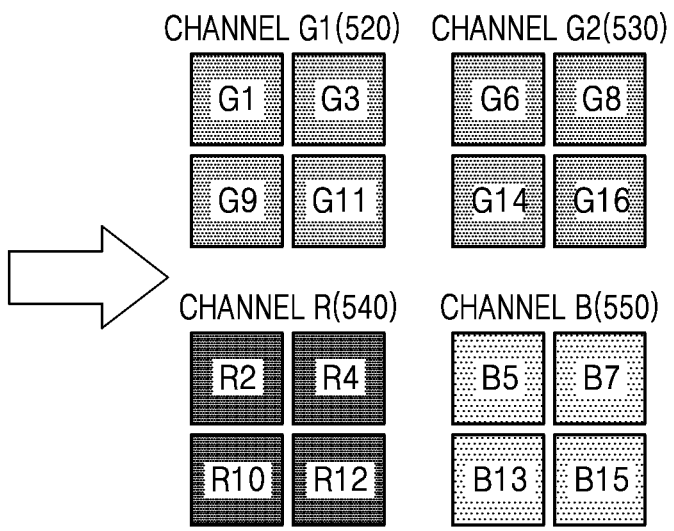

METHOD AND APPARATUS FOR PROCESSING IMAGE

CROSS-REFERENCE TO RELATED APPLICATIONS

This application is based on and claims priority under 35 U.S.C. § 119 to Russian Patent Application No. 2017115447, filed on May 3, 2017, in the Russian Patent and Trademark Office, and Korean Patent Application No. 10-2018-0042920, filed on Apr. 12, 2018, in the Korean Intellectual Property Office, the disclosures of which are incorporated by reference herein in their entirety.

BACKGROUND

1. Field

The disclosure relates to a method of processing an image, an apparatus for processing an image, and a non-transitory computer-readable recording medium having embodied thereon a program for executing the method of processing the image.

2. Description of Related Art

As user's interest in high-resolution images has increased, various techniques for high-resolution images having high image quality have been developed. Related arts for increasing the quality of an image may be classified into image processing through an iterative approach and image processing through a non-iterative approach. The iterative approach of the related arts requires high calculation complexity, which causes a large calculation cost and a low processing speed. The non-iterative approach of the related arts requires relatively low calculation complexity. However, the non-iterative approach does not take into account fractional pixel movement, and thus, the quality of an obtained image is deteriorated. Accordingly, an image processing technique configured to improve these problems of the related arts needs to be developed.

SUMMARY

Provided are a method and an apparatus for processing an image, whereby the loss of image data is minimized and the quality of an image is improved.

Additional aspects will be set forth in part in the description which follows and, in part, will be apparent from the description, or may be learned by practice of the presented embodiments.

In accordance with an aspect of the disclosure, a method of processing an image includes: obtaining a pixel shift set indicating information of movement of a plurality of pixels included in coinciding portions among a plurality of low-resolution images with respect to a single scene; dividing the pixel shift set into an integer portion and a fractional portion and generating an integer pixel shift set and a fractional pixel shift set; selecting a filter set corresponding to the plurality of pixels from among a plurality of pre-stored filter sets including a filter weight value applied to the pixels, based on the fractional pixel shift set; and obtaining a high-resolution image with respect to the single scene, based on the plurality of low-resolution images, the selected filter set, and the integer pixel shift set.

The generating of the fractional pixel shift set may include selecting fractional shift values corresponding to a value within a pre-set range, from among fractional shift values of the plurality of pixels and generating the fractional pixel shift set by combining the selected fractional shift values.

The selecting of the filter set may include selecting the filter set corresponding to the plurality of pixels from among the plurality of pre-stored filter sets, based on the fractional filter shift set and a pre-set regularizer.

A number of the plurality of pre-stored filter sets may be determined based on at least one pixel shift coincidence property of the plurality of pixels included in the coinciding portions among the plurality of low-resolution images.

The plurality of pre-stored filter sets may include a non-directional filter set and a directional filter set, and the selecting of the filter set may include selecting the filter set based on the fractional pixel shift set and whether or not a texture of the coinciding portions among the plurality of low-resolution images has directionality.

The method may further include: determining a noise-reduction parameter with respect to the pixels of the plurality of low-resolution images, wherein the noise-reduction parameter includes a noise model, a size of the coinciding portions, a search radius with respect to adjacent image portions, and a relationship between a pixel brightness and a pixel noise standard deviation; obtaining a texture-dependent noise-reduction coefficient based on a change in brightness of the pixels of the plurality of low-resolution images; determining an estimated value of the pixel noise standard deviation, by using the relationship between the pixel brightness and the pixel noise standard deviation, the texture-dependent noise-reduction coefficient, and a noise-reduction coefficient pre-set by a user; and obtaining a plurality of noise-reduced low-resolution images by performing a three-dimensional noise-reduction operation on the plurality of low-resolution images, based on the noise-reduction parameter and the estimated value of the pixel noise standard deviation, wherein the pixel shift set is obtained from the plurality of noise-reduced low-resolution images.

The method may further include: generating a fallback map indicating a fidelity of pixel shift values included in the pixel shift set, based on the pixel shift set; and determining a texture direction of the plurality of noise-reduced low-resolution images, wherein the selecting of the filter set includes selecting the filter set corresponding to the plurality of pixels from among the plurality of pre-stored filter sets, based on the fallback map, the fractional pixel shift set, and the texture direction.

The plurality of low-resolution images with respect to the single scene may include RGB images.

The plurality of low-resolution images with respect to the single scene may include Bayer images.

The method may further include: converting the high-resolution image having a format of an RGB image into a YUV image; obtaining a pixel standard deviation map with respect to channel Y, with respect to the YUV image; performing cross bilinear filtering on channel U and channel V, based on a reference channel obtained by performing smoothing on the pixel standard deviation map; and obtaining the high-resolution image post-processed by converting the YUV image, to which the cross bilinear filtering is applied, into the format of the RGB image.

In accordance with another aspect of the disclosure, an apparatus for processing an image may include: at least one processor; and a memory storing one or more instructions that, when executed by the at least one processor, cause the apparatus to: obtain a pixel shift set indicating information of movement of a plurality of pixels included in coinciding portions among a plurality of low-resolution images with respect to a single scene; divide the pixel shift set into an integer portion and a fractional portion and generate an integer pixel shift set and a fractional pixel shift set; select a filter set corresponding to the plurality of pixels from among a plurality of pre-stored filter sets including a filter weight value applied to the pixels, based on the fractional pixel shift set; and obtain a high-resolution image with respect to the single scene, based on the plurality of low-resolution images, the selected filter set, and the integer pixel shift set.

In accordance with another aspect of the disclosure, a method of processing an image includes obtaining a pixel shift set indicating information of movement of a plurality of pixels included in coinciding portions among a plurality of low-resolution images with respect to a single scene; dividing the pixel shift set into an integer portion and a fractional portion; generating an integer pixel shift set and a fractional pixel shift set; selecting a filter set corresponding to the plurality of pixels from among a plurality of pre-stored filter sets including a filter weight value applied to the pixels; and obtaining a high-resolution image with respect to the single scene, based on the plurality of low-resolution images, the selected filter set, and the integer pixel shift set.

In accordance with yet another aspect of the disclosure, an apparatus for processing an image includes at least one processor; and a memory storing one or more instructions that, when executed by the at least one processor, cause the apparatus to: obtain a pixel shift set indicating information of movement of a plurality of pixels included in coinciding portions among a plurality of low-resolution images with respect to a single scene; divide the pixel shift set into an integer portion and a fractional portion; generate an integer pixel shift set and a fractional pixel shift set; select a filter set corresponding to the plurality of pixels from among a plurality of pre-stored filter sets including a filter weight value applied to the pixels; and obtain a high-resolution image with respect to the single scene, based on the plurality of low-resolution images, the selected filter set, and the integer pixel shift set.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a diagram for describing a method of decreasing a vector when estimating a texture direction via an image processing apparatus, according to an embodiment;

FIG. 5 is a diagram for describing a method of dividing pixels of an original Bayer image into separate color channels, based on a method of processing an image according to an embodiment;

DETAILED DESCRIPTION

Figure 1:
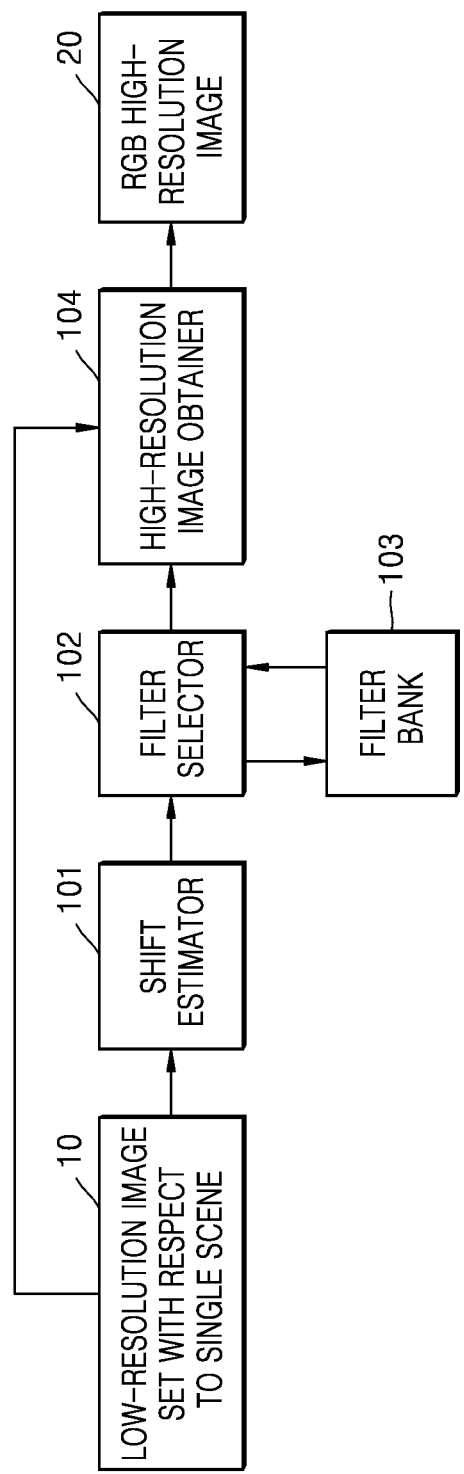
FIG. 1 is a block diagram of an image processing apparatus according to an embodiment.

Hereinafter, embodiments will be described in detail by referring to the accompanying drawings, so that one of ordinary skill in the art may easily execute the embodiments. However, the disclosure may be embodied in different forms and should not be construed as limited to the embodiments set forth herein. In the drawings, portions not related to the descriptions are omitted to clearly describe the disclosure, and like reference numerals refer to like elements throughout the specification. As used herein, the term "and/or" includes any and all combinations of one or more of the associated listed items. Expressions such as "at least one of," when preceding a list of elements, modify the entire list of elements and do not modify the individual elements of the list.

The embodiments described in the disclosure and the accompanying drawings are presented to describe the disclosure, as examples of various embodiments, and the disclosure is not limited to the described embodiments and the accompanying drawings.

The terms used in the specification may be understood to describe various components. However, the components are not limited by the terms. The terms are only used to distinguish one component from another component.

It will be understood that although the terms "first," "second," etc. may be used herein to describe components of the specification, these components should not be limited by these terms. The terms are only used to distinguish one component from another.

Also, the term "comprise," "include," or the like used in this specification does not exclude addition of a characteristic, a value, an operation, a component, and a group thereof.

The accompanying drawings may be schematically illustrated to describe an embodiment. Several sizes may be exaggerated for clear representations. Similarly, a great portion of the drawings may be represented arbitrarily.

The term "unit," or "module," used in this specification should be interpreted to include software, hardware or a combination thereof according to context in which the term is used. For example, software may include a machine language, firmware, an embedded code, and application software. As another example, hardware may include a circuit, a processor, a computer, an integrated circuit, an integrated circuit core, a sensor, a micro-electro-mechanical system (MEMS), a manual device, or a combination thereof.

Assuming that an original high-resolution image X is known, low-resolution images $Y_1, Y_2, \ldots Y_N$ may be derived by performing conversion and continuous down-sampling on an input image. Here, the conversion may include projective transformation or affine transformation. However, this is only an example. The conversion may include other continuous coordinate transformations. The conversion may be caused by motion of a camera between moments of capturing low-resolution input images. Also, the conversion may partially be caused by movement of objects in a frame. When capturing a low-resolution image via an actual optical system, smoothing of the optical system may be performed based on a point spread function (PSF), when the conversion and the down-sampling are applied to an ideal high-resolution image. The low-resolution images may be obtained from the high-resolution image based on Equation 1 as follows.

$$Y_k = DGM_k X + v \quad \text{[Equation 1]}$$

In Equation 1, D is a down-sampling operator, G is a smoothing operator, $M_k$ is a conversion operator for obtaining a $k^{th}$ image, and v is noise. The operator G may be experimentally or theoretically estimated based on a detailed description of the optical system, or may be approximately calculated based on a quality reference for a result image.

The conversion operator $M_k$ may be derived by using a shift estimation method. In this case, a vectorized low-resolution image is assumed as X and $Y_1$. When a two-dimensional original image is represented as a matrix $$\begin{bmatrix} x_{11} & x_{12} & x_{13} & x_{14} \\ x_{21} & x_{22} & x_{23} & x_{24} \\ x_{31} & x_{32} & x_{33} & x_{34} \\ x_{41} & x_{42} & x_{43} & x_{44} \end{bmatrix},$$

the vectorized image may be represented as $X = |x_{11}\ x_{21}\ x_{31}\ x_{41}\ x_{12}\ x_{22}\ x_{32}\ x_{42}\ x_{13}\ x_{23}\ x_{33}\ x_{43}\ x_{14}\ x_{24}\ x_{34}\ x_{44}|^T$.

The down-sampling matrix D, which is obtained by compressing an n×n sized image by k times in a height direction and m times in a width direction, may have the form of $$I_{\frac{n}{m}} \otimes e_{1,m}^T \otimes I_{\frac{n}{k}} \otimes e_{1,k}^T,$$

wherein $\otimes$ is a Kronecker product, $I_n$ is a unit matrix of an n×n sized matrix, and $e_{m,n}$ is an $m^{th}$ column of a matrix $I_n^*$. Thus, in order to decrease the matrix by two times and obtain a matrix $$Y = \begin{bmatrix} x_{11} & x_{13} \\ x_{31} & x_{33} \end{bmatrix},$$

a vectorized original matrix X has to be multiplied by a matrix $$D = \begin{bmatrix} 1 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 1 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 1 & 0 & 0 & 0 & 0 & 0 \end{bmatrix},$$

and a vector of a length 4 has to be converted to a 2×2 sized matrix.

Thus, with respect to an m×n sized high-resolution image and an $$\frac{m}{S} \times \frac{n}{S}$$

sized low-resolution image, the matrices G and $M_k$ may have an mn×mn size and the matrix D may have an $$\frac{mn}{S^2} \times mn$$

size. Also, in order not to lose the generality, the high-resolution image may be limited to a square image having an n×n size.

With respect to a low-resolution image formation model, an operation of obtaining a high-resolution image may be defined as minimizing a function according to Equation 2 below.

$$f = \sum_k \|DGM_k X - Y_k\|^2 \quad \text{[Equation 2]}$$

The operation may be defined based on other principles. However, one of the easiest methods of obtaining the value is a square law, which is to be used hereinafter.

According to an embodiment, the smoothing operator G may be the same as the embodiment described above (that is, smoothing is not performed), and the conversion operator may be a circulation shift based on a pixel $y_k$ in a height direction and a pixel $x_k$ in a width direction. Here, the matrix of this operator may be formed as $M(x_k, y_k) = (I_n \otimes P_n^{y_k}) \cdot (P_n^{x_k} \otimes I_n)$. Here, a matrix $P_n^m$ may be a matrix of an operator performing a circulation shift of a column of an n×n sized matrix by m.

In order to shift the matrix $$\begin{bmatrix} x_{11} & x_{12} & x_{13} & x_{14} \\ x_{21} & x_{22} & x_{23} & x_{24} \\ x_{31} & x_{32} & x_{33} & x_{34} \\ x_{41} & x_{42} & x_{43} & x_{44} \end{bmatrix},$$

the conversion may be performed by one pixel in the height direction and two pixels in the width direction, thereby obtaining a matrix $$\begin{bmatrix} x_{44} & x_{43} & x_{41} & x_{42} \\ x_{14} & x_{13} & x_{11} & x_{12} \\ x_{24} & x_{23} & x_{21} & x_{22} \\ x_{34} & x_{33} & x_{31} & x_{32} \end{bmatrix}.$$

The converted matrix may be obtained as follows.

$$M = \begin{bmatrix} 0 & 0 & 0 & 0 & 0 & 0 & 0 & 0 & 0 & 0 & 1 & 0 & 0 & 0 & 0 \\ 0 & 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 0 & 0 & 0 & 0 & 0 & 1 \\ 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 0 & 0 & 1 & 0 \\ 0 & 0 & 0 & 1 & 0 & 0 & 0 & 0 & 0 & 0 & 0 & 0 & 0 & 0 & 0 \\ 1 & 0 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 & 0 \end{bmatrix}$$

According to the embodiment, it is assumed that four low-resolution images $Y_0, Y_1, Y_2, Y_3$ are obtained from a high-resolution image by using a shift $x_0=0$, $y_0=0$; $x_1=1$; $x_2=1$, $y_2=0$; $x_3=1$, $y_3=1$ and two down-sampling operations. The original image may be simply "combined" from pixels of the low-resolution images.

When a movement of some images is repeated, the whole reconstruction may be impossible. When the whole reconstruction is impossible or the operation is defective, additional constraints may be added to obtain a high-resolution image. According to the disclosure, the additional constraints may be applied by using a regularizing term R (also, referred to as a "regularizer"). The additional constraints, which may be defined as the regularizing term R, may be applied to Equation 2 above, and Equation 3 below may be derived.

$$f = \sum_k \|DGM_k X - Y_k\|^2 + R(X) \qquad \text{[Equation 3]}$$

A method of processing an image according to an embodiment may obtain a high-resolution image from a low-resolution image set with respect to a single scene, without using an iterative method. Here, a regularizer Tikhonov may be used. For example, the regularization operation may be performed based on a regularizer $R(X)=\lambda\|HX\|^2$. Here, $\lambda$ is a scalar regularization parameter and H is an operator. In this case, an optimized function may be composed based on the following equation.

$$f = \|WX - \hat{Y}\|^2 + \lambda \|HX\|^2 \qquad \text{[Equation 4]}$$

In Equation 4 above, $$W = \begin{bmatrix} DGM_1 \\ DGM_2 \\ \vdots \\ DGM_k \end{bmatrix}, \hat{Y} = \begin{bmatrix} Y_1 \\ Y_2 \\ \vdots \\ Y_k \end{bmatrix}.$$

The optimization of this type may have an analysis value represented by Equation 5.

$$X = A \cdot \hat{Y}, \; A = (W^T W + \lambda^2 \cdot H^T H)^{-1} \cdot W^T. \qquad \text{[Equation 5]}$$

Through the analysis value of Equation 5, it may be identified that each pixel of the high-resolution image having a coordinate i,j may be derived by a linear combination of pixels of an input low-resolution image based on Equation 6.

$$x_{ij} = \sum_{k=1\ldots K} \sum_{i=1\ldots \frac{n}{s}} \sum_{m=1\ldots \frac{n}{s}} w_{i,j,l,m}^k \cdot y_{lm}^k \qquad \text{[Equation 6]}$$

In Equation 6, $y_{lm}^k$ is a pixel having a coordinate l,m in a kth input low-resolution image, and s is an integer (indicating by how many times a size of a high-resolution image is different from a size of a low-resolution image) corresponding to a down-sampling coefficient. A value $w_{i,j,l,m}^k$ of a weight coefficient may be derived from an element having a coordinate $$(i-1)n + j, \; (k-1) \cdot \left(\frac{n}{s}\right)^2 + (l-1) \cdot \frac{n}{s} + m$$

in a matrix A. That is, the value $w_{i,j,l,m}^k$ of the weight coefficient may be represented as Equation 7.

$$w_{i,j,l,m}^k = A\left((i-1)n + j, \; (k-1)\left(\frac{n}{s}\right)^2 + (l-1) \cdot \frac{n}{s} + m\right) \qquad \text{[Equation 7]}$$

In Equation 7, the parentheses indicate sampling of the corresponding element in the matrix.

It may be inefficient to store solutions of all probable problems with respect to all possible shifts. In particular, it is problematic since a storage space is needed for a method not currently used. Accordingly, a method according to an embodiment may assign two constraints to provide a solution. First, according to the disclosure, only the conversion operator $M_k$ corresponding to the same shift of all pixels of the high-resolution image will be considered. Second, according to the disclosure, only an operator H indicating a convolution having a non-zero core h, with respect to which a sum of elements is 0, will be considered. Here, for example, $$h = \begin{bmatrix} -\frac{1}{8} & -\frac{1}{8} & -\frac{1}{8} \\ -\frac{1}{8} & 1 & -\frac{1}{8} \\ -\frac{1}{8} & -\frac{1}{8} & -\frac{1}{8} \end{bmatrix}.$$

Based on the first constraint, a solution parameter $w_{lm}^k(M_0, M_1, \ldots M_k)$ may be specified with respect to k shift pairs in height and width directions, rather than with respect to k matrices having an n×n size. The solution parameter $w_{lm}^k(M_0, M_1, \ldots M_k)$ may be represented based on Equation 8 as follows.

$$w_{lm}^k(M_0, M_1, \ldots M_k) = w_{lm}^k(u_0, u_1, \ldots u_k, v_0, v_1, \ldots v_k) \qquad \text{[Equation 8]}$$

The reconstruction of the high-resolution image may be performed based on a matrix $A(u_0, u_1, \ldots u_k, v_0, v_1, \ldots v_k)$ pre-calculated and stored with respect to all possible combinations of the shift $u_0, u_1, \ldots u_k, v_0, v_1, \ldots v_k$.

According to the disclosure, a very precise approximate value A may be provided by storing only several elements from the matrix $A(u_0,u_1, \ldots u_k,v_0,v_1, \ldots v_k)$. That is, by storing a result with respect to only a set $\tilde{u}_0, \tilde{u}_1, \ldots \tilde{u}_k, \tilde{v}_0, \tilde{v}_1, \ldots \tilde{v}_k$, such as $$|\tilde{u}_t| \leq \frac{1}{2^j}, |\tilde{v}_t| \leq \frac{1}{2^j} \quad 0 \leq t \leq k,$$

the approximate value A which is very precise may be obtained. In addition, via this, it may be identified that an initial assumption that a shift related between pixels of the low-resolution image is equal, with respect to all pixels of the low-resolution image, may not be necessary.

According to the disclosure, the high-resolution image may be obtained from a set of the low-resolution images by assuming that only an adjacent pixel having an approximate size $\varepsilon \times \varepsilon$ in the low-resolution image has the same shift with respect to a corresponding pixel of another low-resolution image.

Hereinafter, embodiments of the disclosure will be described in more detail by referring to the accompanying drawings.

FIG. 1 is a block diagram of an image processing apparatus 100 according to an embodiment.

Referring to FIG. 1, the image processing apparatus 100 according to an embodiment may include a shift estimator 101, a filter selector 102, a filter bank 103, and a high-resolution image obtainer 104. However, this is only an embodiment of the image processing apparatus 100, and components of the image processing apparatus 100 are not limited thereto. As another example, the image processing apparatus 100 may include more or less components than the components described above.

The shift estimator 101 may receive a low-resolution image set 10 including a plurality of low-resolution images with respect to a single scene. The shift estimator 101 may obtain a pixel shift set with respect to all pixels of the low-resolution image set 10. The pixel shift set may include information about movement of pixels included in coinciding portions among the plurality of low-resolution images.

The shift estimator 101 according to an embodiment may assume a shift value with respect to pixels included in a first low-resolution image as 0, and may determine a shift value with respect to pixels included in other low-resolution images based on the first low-resolution image. When the low-resolution image set 10 of a single scene includes RGB images, the following operation may be performed on each $s \times s$ pixel of an output image having a coordinate $i=i0..i0+s, j=j0..j0+s$: (s indicates a down-sampling coefficient.)

calculate a coordinate $$\hat{i} = \frac{i0}{s}, \hat{j} = \frac{j0}{s}$$

of each pixel of the first low-resolution image calculate a shift $\hat{u}_1, \ldots \hat{u}_k, \hat{v}_1, \ldots \hat{v}_k$ with respect to a pixel of the first low-resolution image, the pixel having a coordinate $\hat{i}, \hat{j}$, with respect to pixels of other low-resolution images corresponding to portions of the first low-resolution image Thereafter, the shift estimator 101 may obtain an integer pixel shift set by calculating an integer pixel shift with respect to each pixel shift. The integer pixel shift set may correspond to the pixel shift set with respect to the low-resolution image.

Also, the shift estimator 101 may obtain a fractional pixel shift set by calculating a fractional pixel shift with respect to each pixel shift. According to an embodiment, values included in the fractional pixel shift may be between 0 and 1. Here, the fractional pixel shift set may correspond to the pixel shift set with respect to the low-resolution image. For example, when a shift value of a pixel is 7.3, an integer shift value may be 7, and a fractional shift value may be 0.3. As another example, when the shift value of the pixel is −4.5, the integer shift value may be −5 and the fractional shift value may be 0.5.

An integer shift $\hat{u}t^{integer}_t = [\hat{u}_t], \hat{v}^{integer}_t = [\hat{v}_t]$ may be calculated and a fractional shift $\hat{u}^{franctional}_t = \hat{u}_t - \hat{u}^{integer}_t, \hat{v}^{fractional}_t = \hat{v}_t - \hat{v}^{integer}_t$ may be calculated with respect to each pixel shift of the low-resolution images $\hat{u}_1, \ldots \hat{u}_k, \hat{v}_1, \ldots \hat{v}_k$, wherein a square bracket may indicate an operation to induce an integer portion.

The filter bank 103 may store a pre-calculated filter set. The filter set may be a set of values obtained from the matrix A uniquely reconstructed with respect to a shift set $u_0,u_1, \ldots u_k,v_0,v_1, \ldots v_k$. Based on the first constraint and the second constraint described above, $\varepsilon \times \varepsilon$ pixels of an input image may be used to reconstruct each pixel of an output image. The filter bank 103 may include a combination of calculated filter sets with respect to every possible combination $\tilde{u}_0, \tilde{u}_1, \ldots \tilde{u}_k, \tilde{v}_0, \tilde{v}_1, \ldots \tilde{v}_k$, such as $$|\tilde{u}_t| \leq \frac{1}{2^j}, |\tilde{v}_t| \leq \frac{1}{2^j} \quad 0 \leq t \leq k,$$

wherein k indicates the number of low-resolution images that are used.

The filter selector 102 may select a filter set from the filter bank 103 based on the fractional pixel shift set. The filter set $F^{\Delta i, \Delta j}_0, F^{\Delta i, \Delta j}_1, \ldots F^{\Delta i, \Delta j}_k$ corresponding to each fractional shift $\hat{u}^{fractional}_t, \hat{v}^{fractional}_t$ of the low-resolution image may be selected, and each filter $F^{\Delta i, \Delta j}_t$ may include a $\varepsilon \times \varepsilon$ value (a filter weight coefficient). The filter $F^{\Delta i, \Delta j}_t$ may be represented as Equation 9 as follows:

$$F^{\Delta i,\Delta j}_t = \begin{bmatrix} w^{t,\Delta i,\Delta j}_{11} & w^{t,\Delta i,\Delta j}_{12} & \ldots & w^{t,\Delta i,\Delta j}_{1\varepsilon} \\ w^{t,\Delta i,\Delta j}_{12} & w^{t,\Delta i,\Delta j}_{22} & \ldots & w^{t,\Delta i,\Delta j}_{2\varepsilon} \\ \vdots & \vdots & \ddots & \vdots \\ w^{t,\Delta i,\Delta j}_{1\varepsilon} & w^{t,\Delta i,\Delta j}_{2\varepsilon} & \ldots & w^{t,\Delta i,\Delta j}_{\varepsilon\varepsilon} \end{bmatrix} \text{ and} \quad \text{[Equation 9]}$$

$$\Delta i = 0 \ldots s, \Delta j = 0 \ldots s$$

In Equation 9, $w^{t,\Delta i,\Delta j}_{l,m}$ is the filter weight coefficient.

The high-resolution image obtainer 104 may obtain an RGB high-resolution image 20 by calculating pixels of a high-resolution image, based on the set of low-resolution images, the set of selected filters, and the set of integer pixel shifts. The operation of obtaining the RGB high-resolution image 20 may be performed as follows.

First, a set $P_0, \ldots P_k$ of pixels may be selected as represented in Equation 10, based on the low-resolution images.

$$P_t = \begin{vmatrix} p^t_{11} & p^t_{12} & \cdots & p^t_{1\varepsilon} \\ p^t_{12} & p^t_{22} & \cdots & p^t_{2\varepsilon} \\ \vdots & \vdots & \ddots & \vdots \\ p^t_{1\varepsilon} & p^t_{2\varepsilon} & \cdots & p^t_{\varepsilon\varepsilon} \end{vmatrix}$$  [Equation 10]

In Equation 10, $P_{lm}{}^t$ indicates a pixel having a coordinate $\hat{i}+\hat{u}^{integer}{}_t+1, j+\hat{v}^{integer}{}_t+m$ in an input image t. Then, each pixel having a coordinate $i+i0+\Delta i, j=j0+\Delta j, \Delta i=0..s, \Delta j=0..s$ in an output image block may be calculated as a sum of scalar multiplification of $P_t$ and $F^{\Delta i, \Delta j}{}_t$ with respect to $t=0..k$, as represented in Equation 11.

$$x_{i0+\Delta i, j0+\Delta j} = \sum_{t=0...k} \sum_{l=1...\varepsilon} \sum_{m=1...\varepsilon} w^{t,\Delta i,\Delta j}_{lm} \cdot p^t_{lm}$$  [Equation 11]

The image processing apparatus 100 according to an embodiment may not use an iterative method, and may determine the value of the pixels included in a high-resolution image by using the method described above, thereby obtaining the high-resolution image in real time.

According to another embodiment, when a high-resolution image is obtained from a plurality of low-resolution Bayer images with respect to a single scene, operations of the image processing apparatus 100 may be different in the following aspects from the operations of the image processing apparatus 100 obtaining the high-resolution image from the RGB format low-resolution.

The processing of a set of the plurality of low-resolution Bayer images may be different from the processing of the RGB low-resolution image, in that the processing of the set of the plurality of low-resolution Bayer images is performed with respect to a group of 2s×2s×3 pixels, rather than s×s pixels, wherein s is a down-sampling coefficient. Here, 3 indicates the number of output color channels.

Calculation of the fractional pixel shift with respect to the low-resolution Bayer images may be different from calculation of the fractional pixel shift with respect to the RGB image. In the case of the Bayer images, the calculation of the fractional pixel shift may be performed based on the Lucas-Kanade optical flow method.

The Lucas-Kanade optical flow method is as follows.

First, the image processing apparatus 100 may calculate time $\nabla t$ and gradients $\nabla x$ and $\nabla y$ in a height direction and a width direction in order to obtain a shift (y(i, j), u(i, j)) between points having a coordinate (i, j) with respect to an image $I_1$ and an image $I_0$, based on Equation 12.

$$\nabla x(i, j) = \frac{I_0(i, j+1)}{2} - \frac{I_0(i, j+1)}{2}$$  [Equation 12]

$$\nabla y(i, j) = \frac{I_0(i-1, j)}{2} - \frac{I_0(i+1, j)}{2}$$

The shift may be obtained from the equation $$A^T A \begin{bmatrix} u \\ v \end{bmatrix} = A^T b.$$

Here, $$A = \begin{bmatrix} \nabla^2 x & \nabla x \cdot \nabla y \\ \nabla x \cdot \nabla y & \nabla^2 y \end{bmatrix}, b = \begin{bmatrix} \nabla x \cdot \nabla t \\ \nabla y \cdot \nabla t \end{bmatrix}.$$

The time $\nabla t$ may be dependent on u and v derived from an iterative process. A zero shift may be used as a zero approximate value.

When forming matrices A and b, in order to obtain a more precise result, the adjacent points (i, j) may be used, rather than a sum of individual gradient values in p. Thus, A and b may be obtained based on Equation 13.

$$A = \begin{bmatrix} \sum_{k=-p...p} \sum_{l=-p...p} \nabla^2 x(i+k, j+l) & \sum_{k=-p...p} \sum_{l=-p...p} \nabla x(i+k, j+l) \cdot \nabla y(i+k, j+l) \\ \sum_{k=-p...p} \sum_{l=-p...p} \nabla x(i+k, j+l) \cdot \nabla y(i+k, j+l) & \sum_{k=-p...p} \sum_{l=-p...p} \nabla^2 x(i+k, j+l) \end{bmatrix},$$  [Equation 13]

$$b = \begin{bmatrix} \sum_{k=-p...p} \sum_{l=-p...p} \nabla x(i+k, j+l) \cdot \nabla t(i+k, j+l) \\ \sum_{k=-p...p} \sum_{l=-p...p} \nabla y(i+k, j+l) \cdot \nabla t(i+k, j+l) \end{bmatrix}$$

In order to derive an appropriate result in an area having a low image quality, by using the method described above, regularization may be applied as represented in Equation 14.

$$A = \begin{bmatrix} 4p^2\alpha + \sum_{k=-p...p} \sum_{l=-p...p} \nabla^2 x(i+k, j+l) & \sum_{k=-p...p} \sum_{l=-p...p} \nabla x(i+k, j+l) \cdot \nabla y(i+k, j+l) \\ \sum_{k=-p...p} \sum_{l=-p...p} \nabla x(i+k, j+l) \cdot \nabla y(i+k, j+l) & 4p^2\beta + \sum_{k=-p...p} \sum_{l=-p...p} \nabla^2 x(i+k, j+l) \end{bmatrix},$$  [Equation 14]

As another improving method, smoothing based on a Gaussian window may be applied as represented in Equation 15.

$$A = \begin{bmatrix} \sum_{k=-p...p} \sum_{l=-p...p} w_{k,l} \cdot \nabla^2 x(i+k, j+l) & \sum_{k=-p...p} \sum_{l=-p...p} w_{k,l} \cdot \nabla x(i+k, j+l) \cdot \nabla y(i+k, j+l) \\ \sum_{k=-p...p} \sum_{l=-p...p} w_{k,l} \cdot \nabla x(i+k, j+l) \cdot \nabla y(i+k, j+l) & \sum_{k=-p...p} \sum_{l=-p...p} w_{k,l} \cdot \nabla^2 x(i+k, j+l) \end{bmatrix},$$  [Equation 15]

$$b = \begin{bmatrix} \sum_{k=-p...p} \sum_{l=-p...p} w_{k,l} \cdot \nabla x(i+k, j+l) \cdot \nabla t(i+k, j+l) \\ \sum_{k=-p...p} \sum_{l=-p...p} w_{k,l} \cdot \nabla y(i+k, j+l) \cdot \nabla t(i+k, j+l) \end{bmatrix}$$

The Lucas-Kanade method is designed to determine a shift of an amplitude of maximum one pixel, and thus, another method may be applied in order to estimate a shift corresponding to an amplitude of a plurality of pixels in an actual image. For example, a multi-scale method not using anisotropic filtering may be used. As another example, the image processing apparatus 100 may estimate a shift by using three levels including a ¼ resolution of a YCbCr format, a ½ resolution of a YCbCr format, and an entire image of a Bayer format.

When the image processing apparatus 100, according to an embodiment, forms the matrices A and b with respect to three channels, gradients with respect to all of the three channels may be added. In order to calculate the gradients of the Bayer image, Equation 16 may be used.

$$\nabla x(i, j) = \frac{I_0(i+1, j-1) + I_0(i+1, j+1) - I_0(i-1, j-1) - I_0(i-1, j+1)}{4}$$ [Equation 16]

$$\nabla y(i, j) = \frac{I_0(i+1, j+1) + I_0(i-1, j+1) - I_0(i+1, j-1) - I_0(i-1, j-1)}{4}$$

$$\nabla t(i, j) =$$
$$I_1(i+v, j+u) - \frac{I_0(i+1, j-1) + I_0(i+1, j+1) + I_0(i-1, j-1) - I_0(i-1, j+1)}{4}$$

In Equation 16, the value $I_1(i+v, j+u)$ may be obtained by bilinear interpolation of the Bayer image using a pixel $I_1(\lfloor i+v \rfloor, \lfloor j+u \rfloor), I_1(\lfloor i+v \rfloor+2, \lfloor j+u \rfloor) I_1(\lfloor i+v \rfloor, \lfloor j+u \rfloor+2) I_1(\lfloor i+v \rfloor+2 \lfloor j+u \rfloor+2)$ having the same color, with respect to a blue color and a red color. Here, $\lfloor \cdot \rfloor$ indicates a rounding down operator. With respect to green pixels, the bilinear interpolation may be applied to pixels $I_1(]i+v[-1,]j+u[), I_1(]i+v[+1,]j+u[(,I_1(]i+v[,]j+u[-1)I_1(]i+v[+2,]j+u[+1)$. Here,]·[ indicates a rounding to the nearest integer operator.

An operation of selecting a set of filters for the Bayer image may be different from an operation of selecting a set of filters for the RGB image. In the case the Bayer image, the filter selector 102 may select a set $F_{0,Ch}^{\Delta i, \Delta j}, F_{1,Ch}^{\Delta i, \Delta j}, \ldots F_{k,Ch}^{\Delta i, \Delta j}$ of filters stored in the filter bank 103. Here, Ch is the number of colors corresponding to a set $\tilde{u}_0, \tilde{u}_1, \ldots \tilde{u}_k, \tilde{v}_0, \tilde{v}_1, \ldots \tilde{v}_k$ of shifts, and each filter $F_{t,Ch}^{\Delta i, \Delta j}$ may include ε×ε values (a filter weight coefficient) as represented in Equation 17.

$$F_{t,Ch}^{\Delta i, \Delta j} = \begin{bmatrix} w_{1,1,Ch}^{t,\Delta i,\Delta j} & w_{1,2,Ch}^{t,\Delta i,\Delta j} & \cdots & w_{1,\varepsilon,Ch}^{t,\Delta i,\Delta j} \\ w_{1,2,Ch}^{t,\Delta i,\Delta j} & w_{2,2,Ch}^{t,\Delta i,\Delta j} & \cdots & w_{2,\varepsilon,Ch}^{t,\Delta i,\Delta j} \\ \vdots & \vdots & \ddots & \vdots \\ w_{1,\varepsilon,Ch}^{t,\Delta i,\Delta j} & w_{2,\varepsilon,Ch}^{t,\Delta i,\Delta j} & \cdots & w_{\varepsilon,\varepsilon,Ch}^{t,\Delta i,\Delta j} \end{bmatrix} \text{ and }$$ [Equation 17]

$$\Delta i = 0 \ldots s, \Delta j = 0 \ldots s$$

In Equation 17, $w_{l,m}^{t,\Delta i,\Delta l}$ is the filter weight coefficient.

The pixel calculation of the high-resolution image using the set of low-resolution Bayer images may be different from the pixel calculation of the high-resolution image using the set of RGB low-resolution images described above, in that according to the pixel calculation of the high-resolution image using the set of low-resolution Bayer images, each pixel of an output image block having a coordinate $i=i0+\Delta i, j=j0+\Delta j, \Delta i=0..2s, \Delta j=0..2s$ with respect to each of the color channels Ch=1..3 is calculated as a sum of scalar multiplication of $P_t$ and $F_{t,Ch}^{\Delta i, \Delta j}$ with respect to t=0..k, as represented in Equation 18.

$$x_{i0+\Delta i, j0+\Delta j, Ch} = \sum_{t=0 \ldots k} \sum_{l=1 \ldots \varepsilon} \sum_{m=1 \ldots \varepsilon} w_{l,m,Ch}^{t,\Delta i,\Delta j} \cdot p_{lm}^t$$ [Equation 18]

Prior filter calculation with respect to the filter bank 103 may be performed by a high performance computer according to the following procedure:

select a size of the high-resolution image to be obtained. For example, an n×n size may be selected.

generate a matrix of a regularization operator H with respect to the image having the n×n size when a previous method of determining a fractional shift has a fidelity of $$\frac{1}{c},$$

wherein c is an involution of 2, set a limited number of shift sets in order to obtain the high-resolution image from a random shift set. Here, $\tilde{u}_0 = \tilde{v}_0 = 0$, and remaining shifts may have one of c values, $$-\frac{1}{2'} - \frac{1}{2} + \frac{1}{c'} - \frac{1}{2} + \frac{2}{c}, \ldots, -\frac{1}{c'}, 0, \frac{1}{c'}, \frac{2}{c'}, \ldots, \frac{1}{2} - \frac{1}{c}.$$

This group of the shift sets may be set as a basic set.

perform the following operation with respect to each shift set $\tilde{u}_0, \tilde{u}_1, \ldots \tilde{u}_k, \tilde{v}_0, \tilde{v}_1, \ldots \tilde{v}_k$ from the basic set calculate the conversion operator $M_t$ to obtain a pixel shift corresponding to the n×n size image, with respect to each pair of shifts $\tilde{u}_t, \tilde{v}_t$ form a matrix $$W = \begin{bmatrix} DGM_1 \\ DGM_2 \\ \vdots \\ DGM_k \end{bmatrix}$$

and a matrix $A = (W^T W + \lambda^2 \cdot H^T H)^{-1}$ select elements corresponding to elements of filters, from the matrix; select a set $F^{\Delta i, \Delta j}_t(\tilde{u}_0, \tilde{u}_1, \ldots \tilde{u}_k, \tilde{v}_0, \tilde{v}_1, \ldots \tilde{v}_k)$ of filters with respect to $t=0..k, \Delta i=0..s, \Delta j=0..s$ based on the following operation select a middle pixel having coordinates i0,j0 from the n×n sized image, wherein i0 and j0 correspond to multiples of the down-sampling coefficient s with respect to $\Delta i=0..s, \Delta j=0..s$, select a row $i0+\Delta i-1)\cdot n+j0+\Delta j$ from the matrix A and determine the selected row as $z^{\Delta i, \Delta j}$ define k continuous sub rows $z^{t,\Delta i,\Delta j}$ each having a length $$\left(\frac{n}{s}\right)^2$$

from each row $z^{\Delta i,\Delta j}$ convert each sub-ordinate row $z^{t,\Delta i,\Delta j}$ into a matrix $z\hat{z}^{t,\Delta i,\Delta j}$ so that a vector element having the number m becomes a matrix element having an index $$\left\lfloor \frac{m}{n/s} \right\rfloor + 1, m - \left\lfloor \frac{m}{n/s} \right\rfloor \cdot \left(\frac{n}{s}\right) + 1,$$

wherein $\lfloor \cdot \rfloor$ indicates the rounding down operator select a $\varepsilon \times \varepsilon$ coefficient $w^{t,\Delta i,\Delta j}_{l,m}$ of the filter $F^{\Delta i,\Delta j}_t$ such as $$w^{t,\Delta i,\Delta j}_{l,m} = \hat{z}^{t,\Delta i,\Delta j}_{\frac{t0}{s}-\frac{\varepsilon}{2}+l,\frac{j0}{s}-\frac{\varepsilon}{2}+m},$$

from each matrix $\hat{z}^{t,\Delta i,\Delta j}$

The prior filter calculation of the filter bank 103 for the set of the low-resolution Bayer images may be different from the prior filter calculation of the filter bank 103 for the set of the RGB low-resolution images, in terms of the following operations:

when the previous method of determining the fractional pixel shift has a fidelity of $$\frac{1}{c},$$

the basic set of shifts is analyzed and each shift has one of 2·c values available between −1 and $$1 - \frac{1}{c}$$

form the matrix $$W = \begin{bmatrix} BD^{RGB}G^{RGB}M_1^{RGB} \\ BD^{RGB}G^{RGB}M_2^{RGB} \\ \vdots \\ BD^{RGB}G^{RGB}M_k^{RGB} \end{bmatrix},$$

wherein $D^{RGB}$ is a down-sampling operator of the RGB image, $G^{RGB}$ is a smoothing operator of the RGB image, and $M^{RGB}_k$ is a conversion operator for obtaining a $k^{th}$ RGB image. In this case, the operators of the RGB images may be obtained from corresponding operators of a one channel-image, based on Equation 19.

$$D^{RGB} = \begin{vmatrix} D & 0 & 0 \\ 0 & D & 0 \\ 0 & 0 & D \end{vmatrix}, G^{RGB} = \begin{vmatrix} G & 0 & 0 \\ 0 & G & 0 \\ 0 & 0 & G \end{vmatrix},$$ [Equation 19]

$$M_k^{RGB} = \begin{vmatrix} M_k & 0 & 0 \\ 0 & M_k & 0 \\ 0 & 0 & M_k \end{vmatrix}$$

However, a down-sampling operator B of the Bayer image may be formed as represented in Equation 20.

$$B = \begin{vmatrix} D_{2,2} & 0 & 0 \\ D_{2,2}P^{s,s} & 0 & 0 \\ 0 & D_{2,2}P^{s,0} & 0 \\ 0 & 0 & D_{2,2}P^{0,s} \end{vmatrix}$$ [Equation 20]

In Equation 20, $D_{2,2}$ is an operator performing two times down-sampling in both height and width directions, and $P^{u,v}$ is an operator of a circulation shift corresponding to a column u in the width direction and a column v in the height direction.

form the matrix $A=(W^TW+\lambda^2 \cdot (H^{RGB})^t \cdot H^{RGB})^{-1}$. The regularizer of a cross channel with respect to the RGB image may be formed based on Equation 21.

$$H^{RGB} = \begin{vmatrix} H & 0 & 0 \\ 0 & H & 0 \\ 0 & 0 & H \\ H_c & -H_c & 0 \\ H_c & 0 & -H_c \\ 0 & H_c & -H_c \end{vmatrix}$$ [Equation 21]

In Equation 21 above, $H_c = \gamma \cdot H$, $\gamma = 3$.

with respect to each of $\Delta i=0..s, \Delta j=0..s$, select three rows $(i0+\Delta i-1) \cdot n+j0+\Delta j$, $(i0+\Delta i-1) \cdot n+j0+\Delta j+n^2$, and $(i0+\Delta i-1) \cdot n+j0+\Delta j+2n^2$ corresponding to three color channels of an output image, from the matrix A, and refer to the selected rows as $Z^{\Delta i,\Delta j}_{Ch}$, Ch=1..3 divide $Z^{\Delta i,\Delta j}_{Ch}$ into k same continuous sub rows $Z^{t,\Delta i,\Delta j}_{Ch}$ from each row in order to convert a vector element of the number m into a matrix element having an index $$\left\lfloor \frac{m}{n/2s} \right\rfloor + 1, m - \left\lfloor \frac{m}{n/2s} \right\rfloor \cdot \left(\frac{n}{2s}\right) + 1,$$

divide each sub-ordinate row $Z^{t,\Delta i,\Delta j}_{Ch}$ into four same continuous parts $Z_{Ch,g1}^{t,\Delta i,\Delta j}, Z_{Ch,g2}^{t,\Delta i,\Delta j}, Z_{Ch,r}^{t,\Delta i,\Delta j}, Z_{Ch,b}^{t,\Delta i,\Delta j}$ and convert each part into matrices (matrices having an $$\frac{n}{2s} \times \frac{n}{2s}$$

size) $\hat{Z}_{Ch,g1}^{t,\Delta i,\Delta j}, \hat{Z}_{Ch,g2}^{t,\Delta i,\Delta j}, \hat{Z}_{Ch,r}^{t,\Delta i,\Delta j}$ and $\hat{Z}_{Ch,b}^{t,\Delta i,\Delta j}$, wherein $\lfloor \cdot \rfloor$ indicates a rounding-down operator select a weight coefficient $w_{l,m,Ch}^{t,\Delta i,\Delta j}$ of $$\frac{\varepsilon}{2} \times \frac{\varepsilon}{2}$$

filters $F_{t,Ch}^{\Delta i,\Delta j}$ having a $\varepsilon \times \varepsilon$ size from the four matrices $\hat{Z}_{Ch,g1}^{t,\Delta i,\Delta j}, \hat{Z}_{Ch,g2}^{t,\Delta i,\Delta j}, \hat{Z}_{Ch,r}^{t,\Delta i,\Delta j}, \hat{Z}_{Ch,b}^{t,\Delta i,\Delta j}$ $$w_{l,m,Ch}^{t,\Delta i,\Delta j} = \begin{cases} \hat{z}_{Ch,g1}^{t,\Delta i,\Delta j}\left(\frac{i0}{2s} - \frac{\varepsilon}{4} + \frac{l}{2}, \frac{j0}{2s} - \frac{\varepsilon}{4} + \frac{m}{2}\right), l \% 2 = 0, m \% 2 = 0 \\ \hat{z}_{Ch,g2}^{t,\Delta i,\Delta j}\left(\frac{i0}{2s} - \frac{\varepsilon}{4} + \frac{l-1}{2}, \frac{j0}{2s} - \frac{\varepsilon}{4} + \frac{(m-1)}{2}\right), l \% 2 = 1, m \% 2 = 1 \\ \hat{z}_{Ch,r}^{t,\Delta i,\Delta j}\left(\frac{i0}{2s} - \frac{\varepsilon}{4} + \frac{l}{2}, \frac{j0}{2s} - \frac{\varepsilon}{4} + \frac{(m-1)}{2}\right), l \% 2 = 0, m \% 2 = 1 \\ \hat{z}_{Ch,b}^{t,\Delta i,\Delta j}\left(\frac{i0}{2s} - \frac{\varepsilon}{4} + \frac{(l-1)}{2}, \frac{j0}{2s} - \frac{\varepsilon}{4} + \frac{m}{2}\right), l \% 2 = 1, m \% 2 = 0 \end{cases}$$

In the case of a c shift quantization level, k input images and s times magnification, and $k \cdot s^2$ filter sets of $c^{2(k-1)}$ sets may be required. Based on a result of an experiment, it is identified that in order to obtain the high-resolution image from the RGB image, it is sufficient to use a filter having an 11×11 size.

Just as only the fractional pixel shift has a value for reconstruction of a minute detail in the high-resolution operation, a shift between pixels of input images has to be less for reliable reconstruction. For example, in the case of a camera of a cellular phone without a tripod, bust capturing may be realized from a less number of input images (equal to or less than 4). The reliable estimation fidelity of the fractional pixel shift is less than a $$\frac{1}{4}$$

pixel. Table B01 shows numerical values calculated and stored with respect to a fidelity of shift estimation practically implementable, the number of input images, and a combination of magnification coefficients.

TABLE B01

| Number of input images $k$ | Magnification factor $s$ | Fidelity $\frac{1}{c}$ of pixel shift estimation | Number of sets of filters | Number of filters in sets | Total number of stored values Mb |
|---|---|---|---|---|---|
| 2 | 2 | ½ | 4 | 8 | 0.003692627 |
| 3 | 2 | ½ | 16 | 12 | 0.02 |
| 4 | 2 | ½ | 64 | 16 | 0.12 |
| 2 | 3 | ¼ | 16 | 18 | 0.03 |
| 3 | 3 | ¼ | 256 | 27 | 0.80 |
| 4 | 3 | ¼ | 4096 | 36 | 17.02 |
| 2 | 4 | ¼ | 16 | 32 | 0.06 |
| 3 | 4 | ¼ | 256 | 48 | 1.42 |
| 4 | 4 | ¼ | 4096 | 64 | 30.25 |

In order to obtain the high-resolution image from an input Bayer image with respect to the c shift quantization level, the k input images, and the s times magnification, $(2c)^{2(k-1)}$ sets of $3 \cdot k \cdot (2s)^2$ filters may be needed. Here, factor 3 may occur when there are three color channels, that is, R (red), G (green), and B (blue), in the image. There is an experimental result showing that a filter of a 16×16 size or a 12×12 size having a slight loss of precision is sufficient to obtain the high-resolution image from the Bayer image. Table B02 represents numerical values calculated and stored in order to obtain the high-resolution image from the Bayer image with respect to a fidelity of pixel shift estimation practically implementable, the number of input images, and a combination of magnification factors.

TABLE B02

| Number of input images $k$ | Magnification factor $s$ | Fidelity $\frac{1}{c}$ of pixel shift estimation | Number of sets of filters | Number of filters in sets | Total number of stored values Mb |
|---|---|---|---|---|---|
| 2 | 2 | ½ | 4 | 8 | 0.003692627 |
| 3 | 2 | ½ | 16 | 12 | 0.02 |
| 4 | 2 | ½ | 64 | 16 | 0.12 |
| 2 | 3 | ¼ | 16 | 18 | 0.03 |
| 3 | 3 | ¼ | 256 | 27 | 0.80 |
| 4 | 3 | ¼ | 4096 | 36 | 17.02 |
| 2 | 4 | ¼ | 16 | 32 | 0.06 |
| 3 | 4 | ¼ | 256 | 48 | 1.42 |
| 4 | 4 | ¼ | 4096 | 64 | 30.25 |

It is identified in Table B02 that the stored numerical values are high. The image processing apparatus 100 may apply pixel shift coincidence properties disclosed as follows, in order to reduce the number of filters stored in the filter bank 103.

The pixel shift coincidence property (1): when two shift sets coincide with each other, up to a change in an order of input images, calculated filters may coincide with each other, up to the order of the input images.

The pixel shift coincidence property (2): when shifts of two sets of shifts $u_0, u_1, \ldots u_k, v_0, v_1, \ldots v_k$ and $\tilde{u}_0, \tilde{u}_1, \ldots \tilde{u}_k, \tilde{v}_0, \tilde{v}_1, \ldots \tilde{v}_k$ coincide with each other, up to a change $u_i = \tilde{v}_i, v_i = \tilde{u}_i$ in a coordinate, calculated filters may coincide with each other, up to an order of a coordinate axis.

The pixel shift coincidence property (3): when shifts of two sets of shifts $u_0, u_1, \ldots u_k, v_0, v_1, \ldots v_k$ and $\tilde{u}_0, \tilde{u}_1, \ldots \tilde{u}_k, \tilde{v}_0, \tilde{v}_1, \ldots \tilde{v}_k$ coincide with each other, up to integer shifts $\Delta x_i$ and $\Delta y_i$, $u_i = \hat{u}_i + \Delta x_i$, $v_i = \tilde{v}_i + \Delta y_i$, and calculated filters may coincide with each other, and when the filters are applied, pixels of the low-resolution images taking into account the integer shifts $\Delta x_i$ and $\Delta y_i$ may be used.

The pixel shift coincidence property (4): when, in two sets of shifts $u_0, u_1, \ldots u_k, v_0, v_1, \ldots v_k$ and $\tilde{u}_0, \tilde{u}_1, \ldots \tilde{u}_k, \tilde{v}_0, \tilde{v}_1, \ldots \tilde{v}_k$, signs coincide $u_i = sx \cdot \tilde{u}_i, v_i = sy \cdot \tilde{v}_i$), wherein $sx = \pm 1, sy = \pm 1$, calculated filters may coincide with respect to a mirror display with respect to a horizontal axis and a vertical axis.

The pixel shift coincidence property (5): when some shifts of two sets of shifts coincide with one another, for example, when $u_i = u_j, v_i = v_j$, a filter set corresponding to one of values of the coinciding shifts may be stored.

The following example shows how these principles are applied to filter bank compression in the RGB image of Table B01, when k=3, c=2, s=2. The number of filters of an original filter bank may be calculated as $2^2(3-1) \cdot 3 \cdot 2^2 = 192$. With respect to c=2, the following shift set may be taken into account (assuming $u_0 = v_0 = 0$).

TABLE B03

| Set No. | $u_1$ | $v_1$ | $u_2$ | $v_2$ | Number of reduced sets based on use of property (1) | Number of reduced sets based on use of property (2) | Number of reduced sets based on use of properties (1) and (2) | Entries of reduced sets |
|---|---|---|---|---|---|---|---|---|
| 1 | 0 | 0 | 0 | 0 | 1 | 1 | 1 | + |
| 2 | 0 | 0 | 0 | ½ | 5 | 3 | 9 | + |
| 3 | 0 | 0 | ½ | 0 | 9 | 2 | 5 | − |
| 4 | 0 | 0 | ½ | ½ | 13 | 4 | 13 | + |
| 5 | 0 | ½ | 0 | 0 | 2 | 9 | 3 | − |
| 6 | 0 | ½ | 0 | ½ | 6 | 11 | 11 | + |
| 7 | 0 | ½ | ½ | 0 | 10 | 10 | 7 | + |
| 8 | 0 | ½ | ½ | ½ | 14 | 12 | 15 | + |
| 9 | ½ | 0 | 0 | 0 | 3 | 5 | 2 | − |
| 10 | ½ | 0 | 0 | ½ | 7 | 7 | 10 | − |
| 11 | ½ | 0 | ½ | 0 | 11 | 6 | 6 | − |
| 12 | ½ | 0 | ½ | ½ | 15 | 8 | 14 | − |
| 13 | ½ | ½ | 0 | 0 | 4 | 13 | 4 | − |
| 14 | ½ | ½ | 0 | ½ | 8 | 15 | 12 | − |
| 15 | ½ | ½ | ½ | 0 | 12 | 14 | 8 | − |
| 16 | ½ | ½ | ½ | ½ | 16 | 16 | 16 | + |

According to the property (3), values $$-\frac{1}{2}, 1, -1, 1\frac{1}{2}, -1\frac{1}{2}$$

may not be included in the shift set according to an analysis. Also, in 6$^{th}$ through 8$^{th}$ rows in the table, sets, which may be obtained from a current set based on the properties (1) and (2), are arranged. In this example, the property (4) is not applied. However, when the condition c=4, s=4 is taken into account, the analyzed number of shifts may be decreased from 256 to 34, when the property (4) is applied.

In the s times image magnification for obtaining each s×s sized output image block, a filter for obtaining each point may be parameterized by a fractional shift between an interpolated point and a point most adjacent to the low-resolution image. Each pixel of the block may be defined as a fractional shift in relation to an upper left corner of the block in a low-resolution coordinate. For example, with respect to s=2, a shift of pixels of a 2×2 block may correspond to $\Delta x_0=0$, $\Delta y_0 = 0;, \Delta x_1 = 0, \Delta y_1 = \frac{1}{2}, \Delta x_2 = \frac{1}{2}, \Delta y_2 = 0; \Delta x_3 = \frac{1}{2}$, and $\Delta y_3 = \frac{1}{2}$.

Assuming that there is a set of shifts $U_a=|u_0\ v_0\ u_1\ v_1\ \ldots\ u_k\ v_k|$, wherein a indicates the number of current sets from among all available shifts which may be renumbered, each filter of a corresponding set may be defined by a shift $\hat{U}_{am}=|u_{0am}\ v_{0am}\ u_{1am}\ v_{1am}\ \ldots\ u_{kam}\ v_{kam}|=U_a=|\Delta x_{0m}\ \Delta y_{0m}\ \Delta x_{1m}\ \Delta y_{1m}\ \ldots\ \Delta x_{km}\ \Delta y_{km}|$. Here, m=1 ... s², and Δx and Δy are values available between 0 and $$1-\frac{1}{s}.$$

In this case, filters corresponding to shifts $\hat{U}_{am}$ and $\hat{U}_{bn}$ may satisfy properties substantially the same as the properties (1) through (5).

The pixel shift coincidence property (6) when the shifts $\hat{U}_{am}$ and $\hat{U}_{bn}$ coincide with each other up to an integer shift, calculated filters may coincide, and when the filters are applied, pixels of low-resolution images taking into account the shifts may be used.

The pixel shift coincidence property (7) when the shifts $\hat{U}_{am}$ and $\hat{U}_{bn}$ coincide with each other up to a change in an order of input images, calculated filters coincide with the order of the input images.

The pixel shift coincidence property (8) when the shifts $\hat{U}_{am}$ and $\hat{U}_{bn}$ coincide with each other up to a change in a coordinate $u_{iam}=v_{ibn}, v_{iam}=u_{ibn}$, calculated filters may coincide, up to an order of a coordinate axis.

The pixel shift coincidence property (9) when the shifts $\hat{U}_{am}$ and $\hat{U}_{bn}$ coincide with each other up to a sign, calculated filters may coincide, up to a mirror display with respect to a horizontal axis and a vertical axis.

The pixel shift coincidence property (10) when, in the shift $\hat{U}_{am}$, elements of some pairs coincide with one another, for example, when $u_{iam}=u_{jam}, v_{iam}=v_{jam}$, values corresponding to i and j in an image may be stored in the set of filters.

The application of these properties may be verified by the same example. Shift sets may be formed as follows, with respect to 7 shift sets included in the reduced shift sets in Table B03, and s=2.

TABLE B04

| No. unique set | $\hat{U}_0: \Delta x_0 = 0, \Delta y_0 = 0$ | $\hat{U}_1: \Delta x_1 = 0, \Delta y_1 = \frac{1}{2}$ | $\hat{U}_2: \Delta x_2 = \frac{1}{2}, \Delta y_2 = 0$ | $\hat{U}_3: \Delta x_3 = \frac{1}{2}, \Delta y_3 = \frac{1}{2}$ |
|---|---|---|---|---|
| 1 | $\|0\ 0\ 0\ 0\ 0\ 0\|$ | $\|\frac{1}{2}\ 0\ \frac{1}{2}\ 0\ \frac{1}{2}\ 0\|$ | $\|0\ \frac{1}{2}\ 0\ \frac{1}{2}\ 0\ \frac{1}{2}\|$ | $\|\frac{1}{2}\ \frac{1}{2}\ \frac{1}{2}\ \frac{1}{2}\ \frac{1}{2}\ \frac{1}{2}\|$ |
| 2 | $\|0\ 0\ 0\ 0\ 0\ \frac{1}{2}\|$ | $\|\frac{1}{2}\ 0\ \frac{1}{2}\ 0\ \frac{1}{2}\ \frac{1}{2}\|$ | $\|0\ \frac{1}{2}\ 0\ \frac{1}{2}\ 0\ 1\|$ | $\|\frac{1}{2}\ \frac{1}{2}\ \frac{1}{2}\ \frac{1}{2}\ \frac{1}{2}\ 1\|$ |
| 3 | $\|0\ 0\ 0\ 0\ \frac{1}{2}\ \frac{1}{2}\|$ | $\|\frac{1}{2}\ 0\ \frac{1}{2}\ 0\ 1\ 0\|$ | $\|0\ \frac{1}{2}\ 0\ \frac{1}{2}\ \frac{1}{2}\ 1\|$ | $\|\frac{1}{2}\ \frac{1}{2}\ \frac{1}{2}\ \frac{1}{2}\ 1\ 1\|$ |
| 4 | $\|0\ 0\ 0\ \frac{1}{2}\ 0\ \frac{1}{2}\|$ | $\|\frac{1}{2}\ 0\ \frac{1}{2}\ \frac{1}{2}\ \frac{1}{2}\ \frac{1}{2}\|$ | $\|0\ \frac{1}{2}\ 0\ 1\ 0\ 1\|$ | $\|\frac{1}{2}\ \frac{1}{2}\ \frac{1}{2}\ 1\ \frac{1}{2}\ 1\|$ |
| 5 | $\|0\ 0\ 0\ \frac{1}{2}\ \frac{1}{2}\ 0\|$ | $\|\frac{1}{2}\ 0\ \frac{1}{2}\ \frac{1}{2}\ 1\ 0\|$ | $\|0\ \frac{1}{2}\ 0\ 1\ \frac{1}{2}\ \frac{1}{2}\|$ | $\|\frac{1}{2}\ \frac{1}{2}\ \frac{1}{2}\ 1\ 1\ \frac{1}{2}\|$ |

TABLE B04-continued

| No. unique set | $\hat{U}_0: \Delta x_0 = 0, \Delta y_0 = 0$ | $\hat{U}_1: \Delta x_1 = 0, \Delta y_1 = \frac{1}{2}$ | $\hat{U}_2: \Delta x_2 = \frac{1}{2}, \Delta y_2 = 0$ | $\hat{U}_3: \Delta x_3 = \frac{1}{2}, \Delta y_3 = \frac{1}{2}$ |
|---|---|---|---|---|
| 6 | $\lvert 0\ \ 0\ \ 0\ \ \frac{1}{2}\ \ \frac{1}{2}\ \ \frac{1}{2} \rvert$ | $\lvert \frac{1}{2}\ \ 0\ \ \frac{1}{2}\ \ \frac{1}{2}\ \ 1\ \ \frac{1}{2} \rvert$ | $\lvert 0\ \ \frac{1}{2}\ \ 0\ \ 1\ \ \frac{1}{2}\ \ 1 \rvert$ | $\lvert \frac{1}{2}\ \ \frac{1}{2}\ \ \frac{1}{2}\ \ 1\ \ 1\ \ 1 \rvert$ |
| 7 | $\lvert 0\ \ 0\ \ \frac{1}{2}\ \ \frac{1}{2}\ \ \frac{1}{2}\ \ \frac{1}{2} \rvert$ | $\lvert \frac{1}{2}\ \ 0\ \ 1\ \ \frac{1}{2}\ \ 1\ \ \frac{1}{2} \rvert$ | $\lvert 0\ \ \frac{1}{2}\ \ \frac{1}{2}\ \ 1\ \ \frac{1}{2}\ \ 1 \rvert$ | $\lvert \frac{1}{2}\ \ \frac{1}{2}\ \ 1\ \ 1\ \ 1\ \ 1 \rvert$ |

The range of Table B04 may be converted to a range of 0 . . . 1, when the property (6) is used.

TABLE B05

| No. unique sets | $\hat{U}_0: \Delta x_0 = 0, \Delta y_0 = 0$ | $\hat{U}_1: \Delta x_1 = 0, \Delta y_1 = \frac{1}{2}$ | $\hat{U}_2: \Delta x_2 = \frac{1}{2}, \Delta y_2 = 0$ | $\hat{U}_3: \Delta x_3 = \frac{1}{2}, \Delta y_3 = \frac{1}{2}$ |
|---|---|---|---|---|
| 1 | $\lvert 0\ \ 0\ \ 0\ \ 0\ \ 0\ \ 0 \rvert$ | $\lvert \frac{1}{2}\ \ 0\ \ \frac{1}{2}\ \ 0\ \ \frac{1}{2}\ \ 0 \rvert$ | $\lvert 0\ \ \frac{1}{2}\ \ 0\ \ \frac{1}{2}\ \ 0\ \ \frac{1}{2} \rvert$ | $\lvert \frac{1}{2}\ \ \frac{1}{2}\ \ \frac{1}{2}\ \ \frac{1}{2}\ \ \frac{1}{2}\ \ \frac{1}{2} \rvert$ |
| 2 | $\lvert 0\ \ 0\ \ 0\ \ 0\ \ 0\ \ \frac{1}{2} \rvert$ | $\lvert \frac{1}{2}\ \ 0\ \ \frac{1}{2}\ \ 0\ \ \frac{1}{2}\ \ \frac{1}{2} \rvert$ | $\lvert 0\ \ \frac{1}{2}\ \ 0\ \ \frac{1}{2}\ \ 0\ \ 0 \rvert$ | $\lvert \frac{1}{2}\ \ \frac{1}{2}\ \ \frac{1}{2}\ \ \frac{1}{2}\ \ \frac{1}{2}\ \ 0 \rvert$ |
| 3 | $\lvert 0\ \ 0\ \ 0\ \ 0\ \ \frac{1}{2}\ \ \frac{1}{2} \rvert$ | $\lvert \frac{1}{2}\ \ 0\ \ \frac{1}{2}\ \ 0\ \ 0\ \ 0 \rvert$ | $\lvert 0\ \ \frac{1}{2}\ \ 0\ \ \frac{1}{2}\ \ \frac{1}{2}\ \ 0 \rvert$ | $\lvert \frac{1}{2}\ \ \frac{1}{2}\ \ \frac{1}{2}\ \ \frac{1}{2}\ \ 0\ \ 0 \rvert$ |
| 4 | $\lvert 0\ \ 0\ \ 0\ \ \frac{1}{2}\ \ 0\ \ \frac{1}{2} \rvert$ | $\lvert \frac{1}{2}\ \ 0\ \ \frac{1}{2}\ \ \frac{1}{2}\ \ \frac{1}{2}\ \ \frac{1}{2} \rvert$ | $\lvert 0\ \ \frac{1}{2}\ \ 0\ \ 0\ \ 0\ \ 0 \rvert$ | $\lvert \frac{1}{2}\ \ \frac{1}{2}\ \ \frac{1}{2}\ \ 0\ \ \frac{1}{2}\ \ 0 \rvert$ |
| 5 | $\lvert 0\ \ 0\ \ 0\ \ \frac{1}{2}\ \ \frac{1}{2}\ \ 0 \rvert$ | $\lvert \frac{1}{2}\ \ 0\ \ \frac{1}{2}\ \ \frac{1}{2}\ \ 0\ \ 0 \rvert$ | $\lvert 0\ \ \frac{1}{2}\ \ 0\ \ 0\ \ \frac{1}{2}\ \ \frac{1}{2} \rvert$ | $\lvert \frac{1}{2}\ \ \frac{1}{2}\ \ \frac{1}{2}\ \ 0\ \ 0\ \ \frac{1}{2} \rvert$ |
| 6 | $\lvert 0\ \ 0\ \ 0\ \ \frac{1}{2}\ \ \frac{1}{2}\ \ \frac{1}{2} \rvert$ | $\lvert \frac{1}{2}\ \ 0\ \ \frac{1}{2}\ \ \frac{1}{2}\ \ 0\ \ \frac{1}{2} \rvert$ | $\lvert 0\ \ \frac{1}{2}\ \ 0\ \ 0\ \ \frac{1}{2}\ \ 0 \rvert$ | $\lvert \frac{1}{2}\ \ \frac{1}{2}\ \ \frac{1}{2}\ \ 0\ \ 0\ \ 0 \rvert$ |
| 7 | $\lvert 0\ \ 0\ \ \frac{1}{2}\ \ \frac{1}{2}\ \ \frac{1}{2}\ \ \frac{1}{2} \rvert$ | $\lvert \frac{1}{2}\ \ 0\ \ 0\ \ \frac{1}{2}\ \ 0\ \ \frac{1}{2} \rvert$ | $\lvert 0\ \ \frac{1}{2}\ \ \frac{1}{2}\ \ 0\ \ \frac{1}{2}\ \ 0 \rvert$ | $\lvert \frac{1}{2}\ \ \frac{1}{2}\ \ 0\ \ 0\ \ 0\ \ 0 \rvert$ |

For convenience of further analysis, elements of Table B05 may be divided into groups according to the number of 0s as follows.

TABLE B06

| No. | No. unique sets | Number of pixel shifts in interpolation | Pixel shift in relation to interpolated point | Number of 0s | possible recurrence |
|---|---|---|---|---|---|
| 1 | 1 | 0 | $\lvert 0\ \ 0\ \ 0\ \ 0\ \ 0\ \ 0 \rvert$ | 6 | 1 |
| 2 | 1 | 1 | $\lvert \frac{1}{2}\ \ 0\ \ \frac{1}{2}\ \ 0\ \ \frac{1}{2}\ \ 0 \rvert$ | 3 | 2, 3, 11, 18, 19, 21, 24, 26, 27 |
| 3 | 1 | 2 | $\lvert 0\ \ \frac{1}{2}\ \ 0\ \ \frac{1}{2}\ \ 0\ \ \frac{1}{2} \rvert$ | 3 | 2, 3, 11, 18, 19, 21, 24, 26, 27 |
| 4 | 1 | 3 | $\lvert \frac{1}{2}\ \ \frac{1}{2}\ \ \frac{1}{2}\ \ \frac{1}{2}\ \ \frac{1}{2}\ \ \frac{1}{2} \rvert$ | 0 | 4 |
| 5 | 2 | 0 | $\lvert 0\ \ 0\ \ 0\ \ 0\ \ 0\ \ \frac{1}{2} \rvert$ | 5 | 5, 15 |
| 6 | 2 | 1 | $\lvert \frac{1}{2}\ \ 0\ \ \frac{1}{2}\ \ 0\ \ \frac{1}{2}\ \ \frac{1}{2} \rvert$ | 2 | 6, 12, 16, 20, 22, 25 |

TABLE B06-continued

| No. | No. unique sets | Number of pixel shifts in interpolation | Pixel shift in relation to interpolated point | Number of 0s | possible recurrence |
|---|---|---|---|---|---|
| 7 | 2 | 2 | $\begin{vmatrix} 0 & \frac{1}{2} & 0 & \frac{1}{2} & 0 & 0 \end{vmatrix}$ | 4 | 7, 9, 10, 13, 17, 23, 28 |
| 8 | 2 | 3 | $\begin{vmatrix} \frac{1}{2} & \frac{1}{2} & \frac{1}{2} & \frac{1}{2} & \frac{1}{2} & 0 \end{vmatrix}$ | 1 | 8, 14 |
| 9 | 3 | 0 | $\begin{vmatrix} 0 & 0 & 0 & 0 & \frac{1}{2} & \frac{1}{2} \end{vmatrix}$ | 4 | 7, 9, 10, 13, 17, 23, 28 |
| 10 | 3 | 1 | $\begin{vmatrix} \frac{1}{2} & 0 & \frac{1}{2} & 0 & 0 & 0 \end{vmatrix}$ | 4 | 7, 9, 10, 13, 17, 23, 28 |
| 11 | 3 | 2 | $\begin{vmatrix} 0 & \frac{1}{2} & 0 & \frac{1}{2} & \frac{1}{2} & 0 \end{vmatrix}$ | 3 | 2, 3, 11, 18, 19, 21, 24, 26, 27 |
| 12 | 3 | 3 | $\begin{vmatrix} \frac{1}{2} & \frac{1}{2} & \frac{1}{2} & \frac{1}{2} & 0 & 0 \end{vmatrix}$ | 2 | 6, 12, 16, 20, 22, 25 |
| 13 | 4 | 0 | $\begin{vmatrix} 0 & 0 & 0 & \frac{1}{2} & 0 & \frac{1}{2} \end{vmatrix}$ | 4 | 7, 9, 10, 13, 17, 23, 28 |
| 14 | 4 | 1 | $\begin{vmatrix} \frac{1}{2} & 0 & \frac{1}{2} & \frac{1}{2} & \frac{1}{2} & \frac{1}{2} \end{vmatrix}$ | 1 | 8, 14 |
| 15 | 4 | 2 | $\begin{vmatrix} 0 & \frac{1}{2} & 0 & 0 & 0 & 0 \end{vmatrix}$ | 5 | 5, 15 |
| 16 | 4 | 3 | $\begin{vmatrix} \frac{1}{2} & \frac{1}{2} & \frac{1}{2} & 0 & \frac{1}{2} & 0 \end{vmatrix}$ | 2 | 6, 12, 16, 20, 22, 25 |
| 17 | 5 | 0 | $\begin{vmatrix} 0 & 0 & 0 & \frac{1}{2} & \frac{1}{2} & 0 \end{vmatrix}$ | 4 | 7, 9, 10, 13, 17, 23, 28 |
| 18 | 5 | 1 | $\begin{vmatrix} \frac{1}{2} & 0 & \frac{1}{2} & \frac{1}{2} & 0 & 0 \end{vmatrix}$ | 3 | 2, 3, 11, 18, 19, 21, 24, 26, 27 |
| 19 | 5 | 2 | $\begin{vmatrix} 0 & \frac{1}{2} & 0 & 0 & \frac{1}{2} & \frac{1}{2} \end{vmatrix}$ | 3 | 2, 3, 11, 18, 19, 21, 24, 26, 27 |
| 20 | 5 | 3 | $\begin{vmatrix} \frac{1}{2} & \frac{1}{2} & \frac{1}{2} & 0 & 0 & \frac{1}{2} \end{vmatrix}$ | 2 | 6, 12, 16, 20, 22, 25 |
| 21 | 6 | 0 | $\begin{vmatrix} 0 & 0 & 0 & \frac{1}{2} & \frac{1}{2} & \frac{1}{2} \end{vmatrix}$ | 3 | 2, 3, 11, 18, 19, 21, 24, 26, 27 |
| 22 | 6 | 1 | $\begin{vmatrix} \frac{1}{2} & 0 & \frac{1}{2} & \frac{1}{2} & 0 & \frac{1}{2} \end{vmatrix}$ | 2 | 6, 12, 16, 20, 22, 25 |
| 23 | 6 | 2 | $\begin{vmatrix} 0 & \frac{1}{2} & 0 & 0 & \frac{1}{2} & 0 \end{vmatrix}$ | 4 | 7, 9, 10, 13, 17, 23, 28 |
| 24 | 6 | 3 | $\begin{vmatrix} \frac{1}{2} & \frac{1}{2} & \frac{1}{2} & 0 & 0 & 0 \end{vmatrix}$ | 3 | 2, 3, 11, 18, 19, 21, 24, 26, 27 |
| 25 | 7 | 0 | $\begin{vmatrix} 0 & 0 & \frac{1}{2} & \frac{1}{2} & \frac{1}{2} & \frac{1}{2} \end{vmatrix}$ | 2 | 6, 12, 16, 20, 22, 25 |
| 26 | 7 | 1 | $\begin{vmatrix} \frac{1}{2} & 0 & 0 & \frac{1}{2} & 0 & \frac{1}{2} \end{vmatrix}$ | 3 | 2, 3, 11, 18, 19, 21, 24, 26, 27 |
| 27 | 7 | 2 | $\begin{vmatrix} 0 & \frac{1}{2} & \frac{1}{2} & 0 & \frac{1}{2} & 0 \end{vmatrix}$ | 3 | 2, 3, 11, 18, 19, 21, 24, 26, 27 |

TABLE B06-continued

| No. | No. unique sets | Number of pixel shifts in interpolation | Pixel shift in relation to interpolated point | Number of 0s | possible recurrence |
|---|---|---|---|---|---|
| 28 | 7 | 3 | $\left\lvert \frac{1}{2}\ \frac{1}{2}\ 0\ 0\ 0\ 0 \right\rvert$ | 4 | 7, 9, 10, 13, 17, 23, 28 |

Some of elements arranged in a $6^{th}$ column in Table B07 may be reduced based on the properties (6) and (7).

TABLE B07

| Number of 0s | Possible recurrence | | Pixel shifts in relation to interpolated point | | | |
|---|---|---|---|---|---|---|
| 0 | 4 | | $\left\lvert \frac{1}{2}\ \frac{1}{2}\ \frac{1}{2}\ \frac{1}{2}\ \frac{1}{2}\ \frac{1}{2} \right\rvert$ | | | |
| | | No. | Pixel shift | | Reduced by using property(7) | |
| 1 | 8, 14 | 8 | $\left\lvert \frac{1}{2}\ \frac{1}{2}\ \frac{1}{2}\ \frac{1}{2}\ \frac{1}{2}\ 0 \right\rvert$ | | 8, 14 | |
| | | 14 | $\left\lvert \frac{1}{2}\ 0\ \frac{1}{2}\ \frac{1}{2}\ \frac{1}{2}\ \frac{1}{2} \right\rvert$ | | 8, 14 | |
| | | No. | Pixel shift | | Reduced by using property(7) | |
| 2 | 6, 12, 16, 20, 22, 25 | 6 | $\left\lvert \frac{1}{2}\ 0\ \frac{1}{2}\ 0\ \frac{1}{2}\ \frac{1}{2} \right\rvert$ | | 6, 16 | |
| | | 12 | $\left\lvert \frac{1}{2}\ \frac{1}{2}\ \frac{1}{2}\ \frac{1}{2}\ 0\ 0 \right\rvert$ | | 12, 25 | |
| | | 16 | $\left\lvert \frac{1}{2}\ \frac{1}{2}\ \frac{1}{2}\ 0\ \frac{1}{2}\ 0 \right\rvert$ | | 6, 16 | |
| | | 20 | $\left\lvert \frac{1}{2}\ \frac{1}{2}\ \frac{1}{2}\ 0\ 0\ \frac{1}{2} \right\rvert$ | | 20, 22 | |
| | | 22 | $\left\lvert \frac{1}{2}\ 0\ \frac{1}{2}\ \frac{1}{2}\ 0\ \frac{1}{2} \right\rvert$ | | 20, 22 | |
| | | 25 | $\left\lvert 0\ 0\ \frac{1}{2}\ \frac{1}{2}\ \frac{1}{2}\ \frac{1}{2} \right\rvert$ | | 12, 25 | |
| | | No. | Pixel shift | reduced by using property(7) | reduced by using property(8) | reduced by using property (7) and property(8) |
| 3 | 2, 3, 11, 18, 19, 21, 24, 26, 27 | 2 | $\left\lvert \frac{1}{2}\ 0\ \frac{1}{2}\ 0\ \frac{1}{2}\ 0 \right\rvert$ | | | 2, 3 |
| | | 3 | $\left\lvert 0\ \frac{1}{2}\ 0\ \frac{1}{2}\ 0\ \frac{1}{2} \right\rvert$ | | | 2, 3 |
| | | 11 | $\left\lvert 0\ \frac{1}{2}\ 0\ \frac{1}{2}\ \frac{1}{2}\ 0 \right\rvert$ | 11, 26 | | 11, 26, 27 |
| | | 18 | $\left\lvert \frac{1}{2}\ 0\ \frac{1}{2}\ \frac{1}{2}\ 0\ 0 \right\rvert$ | 18, 24 | | 18, 19, 21, 24 |
| | | 19 | $\left\lvert 0\ \frac{1}{2}\ 0\ 0\ \frac{1}{2}\ \frac{1}{2} \right\rvert$ | 19, 21 | | 18, 19, 21, 24 |

TABLE B07-continued

| | | No. | Pixel shift | Reduced by using property(7) | reduced by using property(8) | Reduced by using property (7) and property(8) |
|---|---|---|---|---|---|---|
| | | 21 | $\|0\ 0\ 0\ \frac{1}{2}\ \frac{1}{2}\ \frac{1}{2}\|$ | 19, 21 | | 18, 19, 21, 24 |
| | | 24 | $\|\frac{1}{2}\ \frac{1}{2}\ \frac{1}{2}\ 0\ 0\ 0\|$ | 18, 24 | | 18, 19, 21, 24 |
| | | 26 | $\|\frac{1}{2}\ 0\ 0\ \frac{1}{2}\ 0\ \frac{1}{2}\|$ | 11, 26 | | 11, 26, 27 |
| | | 27 | $\|0\ \frac{1}{2}\ \frac{1}{2}\ 0\ \frac{1}{2}\ 0\|$ | | | 11, 26, 27 |
| 4 | 7, 9, 10, 13, 17, 23, 28 | 7 | $\|0\ \frac{1}{2}\ 0\ \frac{1}{2}\ 0\ 0\|$ | | 7, 10 | 7, 10, 13 |
| | | 9 | $\|0\ 0\ 0\ 0\ \frac{1}{2}\ \frac{1}{2}\|$ | 9, 28 | | |
| | | 10 | $\|\frac{1}{2}\ 0\ \frac{1}{2}\ 0\ 0\ 0\|$ | | 7, 10 | 7, 10, 13 |
| | | 13 | $\|0\ 0\ 0\ \frac{1}{2}\ 0\ \frac{1}{2}\|$ | | | 7, 10, 13 |
| | | 17 | $\|0\ 0\ 0\ \frac{1}{2}\ \frac{1}{2}\ 0\|$ | 17, 23 | | |
| | | 23 | $\|0\ \frac{1}{2}\ 0\ 0\ \frac{1}{2}\ 0\|$ | 17, 23 | | |
| | | 28 | $\|\frac{1}{2}\ \frac{1}{2}\ 0\ 0\ 0\ 0\|$ | 9, 28 | | |

| | | No. | Pixel shift | Reduced by using property(6) | | |
|---|---|---|---|---|---|---|
| 5 | 5, 15 | 5 | $\|0\ 0\ 0\ 0\ 0\ \frac{1}{2}\|$ | 5, 11 | | |
| | | 15 | $\|0\ \frac{1}{2}\ 0\ 0\ 0\ 0\|$ | 5, 11 | | |
| 6 | 1 | | $\|0\ 0\ 0\ 0\ 0\ 0\|$ | | | |

The property (8) is completely identical to the property (4), and thus, may be used as a large magnification factor. In Table B08, shifts which may be obtained from all shifts based on the properties (6) to (8) are arranged. To summarize, the analysis may be limited to 13 shifts. Only some filters corresponding to each shift may be stored by using the property (10). The number of filters with respect to each shift is indicated in a $4^{th}$ column of Table B08. As disclosed in Table B08, it is identified that it is sufficient to store 26 filters, rather than original 192 filters, in order to obtain all pixels of the high-resolution image.

TABLE B08

| No. | Numbers in Table B04 | Pixel shift | Number of filters |
|---|---|---|---|
| 1 | 1 | $\|0\ 0\ 0\ 0\ 0\ 0\|$ | 1 |

TABLE B08-continued

| No. | Numbers in Table B04 | Pixel shift | Number of filters |
|---|---|---|---|
| 2 | 2 | $\|\frac{1}{2}\ 0\ \frac{1}{2}\ 0\ \frac{1}{2}\ 0\|$ | 1 |
| 3 | 4 | $\|\frac{1}{2}\ \frac{1}{2}\ \frac{1}{2}\ \frac{1}{2}\ \frac{1}{2}\ \frac{1}{2}\|$ | 1 |
| 4 | 5 | $\|0\ 0\ 0\ 0\ 0\ \frac{1}{2}\|$ | 2 |
| 5 | 6 | $\|\frac{1}{2}\ 0\ \frac{1}{2}\ 0\ \frac{1}{2}\ \frac{1}{2}\|$ | 2 |
| 6 | 7 | $\|0\ \frac{1}{2}\ 0\ \frac{1}{2}\ 0\ 0\|$ | 2 |

TABLE B08-continued

| No. | Numbers in Table B04 | Pixel shift | Number of filters |
|---|---|---|---|
| 7 | 8 | $\left\| \frac{1}{2} \ \frac{1}{2} \ \frac{1}{2} \ \frac{1}{2} \ \frac{1}{2} \ 0 \right\|$ | 2 |
| 8 | 9 | $\left\| 0 \ 0 \ 0 \ 0 \ \frac{1}{2} \ \frac{1}{2} \right\|$ | 2 |
| 9 | 11 | $\left\| 0 \ \frac{1}{2} \ 0 \ \frac{1}{2} \ \frac{1}{2} \ 0 \right\|$ | 2 |
| 10 | 12 | $\left\| \frac{1}{2} \ \frac{1}{2} \ \frac{1}{2} \ \frac{1}{2} \ 0 \ 0 \right\|$ | 2 |
| 11 | 17 | $\left\| 0 \ 0 \ 0 \ \frac{1}{2} \ \frac{1}{2} \ 0 \right\|$ | 3 |
| 12 | 18 | $\left\| \frac{1}{2} \ 0 \ \frac{1}{2} \ \frac{1}{2} \ 0 \ 0 \right\|$ | 3 |
| 13 | 20 | $\left\| \frac{1}{2} \ \frac{1}{2} \ \frac{1}{2} \ 0 \ 0 \ \frac{1}{2} \right\|$ | 3 |
| Total | | | 26 |

Table B09 discloses a result of a compression method with respect to three input images.

TABLE B09

| Format of input images | Number k of input images | Magnification factor s | Fidelity $\frac{1}{c}$ of pixel shift estimation | Number of filters of a full filter bank | Number of filters in compressed filter bank | Compression factor |
|---|---|---|---|---|---|---|
| RGB | 3 | 2 | ½ | 192 | 26 | 7.38 |
| RGB | 3 | 4 | ¼ | 12288 | 300 | 40.96 |
| Bayer pattern | 3 | 2 | ½ | 36864 | 450 | 81.92 |
| Bayer pattern | 3 | 4 | ¼ | 2359296 | 25752 | 91.62 |

Figure 2:
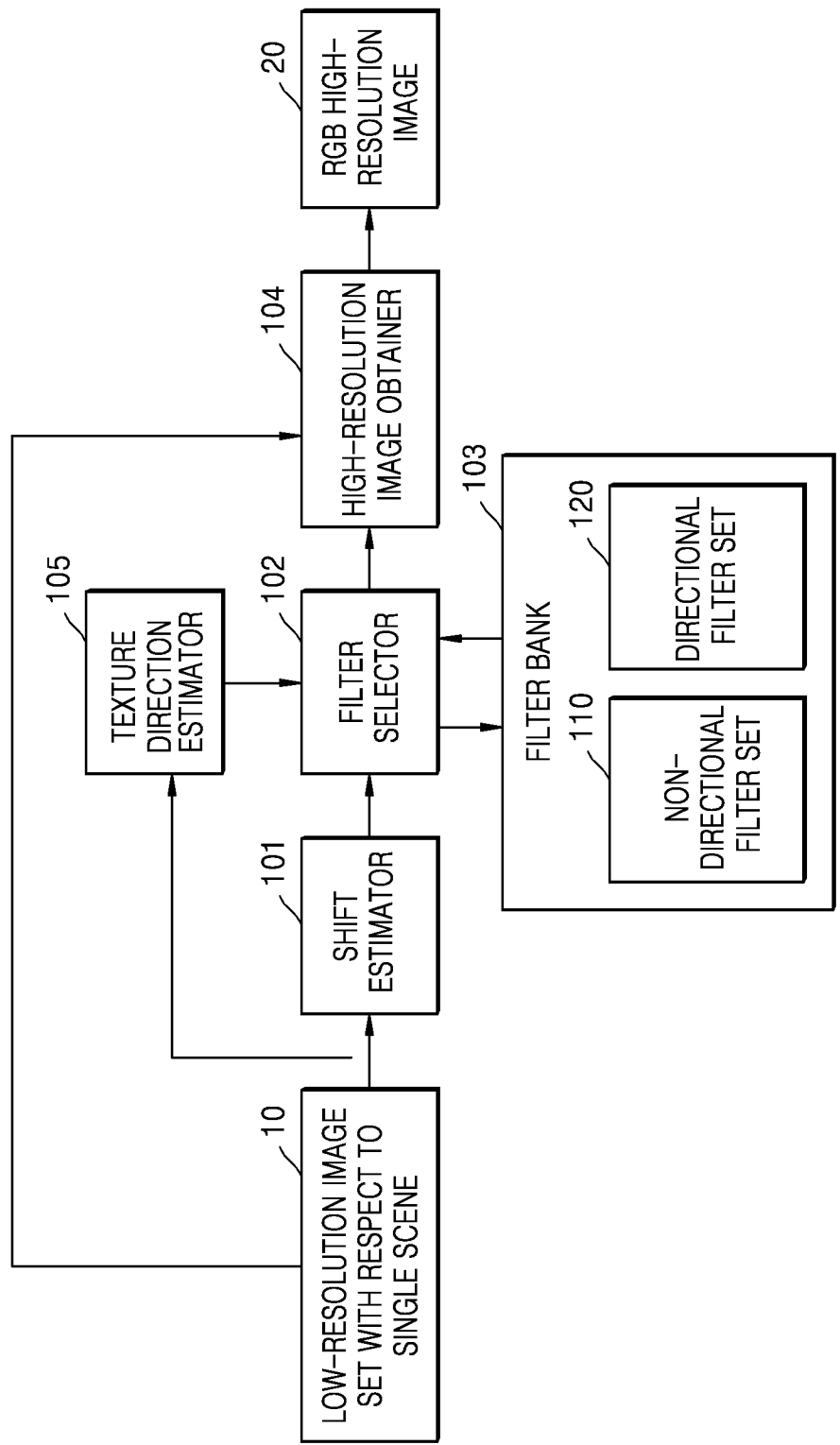
FIG. 2 is a block diagram of an image processing apparatus configured to obtain a high-resolution image from a low-resolution image having a single scene, by taking into account image texture directionality, according to another embodiment.

FIG. 2 is a block diagram of the image processing apparatus 100 configured to obtain a high-resolution image from a low-resolution image having a single scene, by taking into account image texture directionality, according to another embodiment.

The image processing apparatus 100 according to the embodiment illustrated in FIG. 2 may further include a texture direction estimator 105, in addition to the shift estimator 101, the filter selector 102, the filter bank 103, and the high-resolution image obtainer 104 described above with reference to FIG. 1, wherein the texture direction estimator 105 is configured to determine a texture direction of the low-resolution image. Also, according to the embodiment, a filter set stored in the filter bank 103 may include a non-directional filter set 110 and a directional filter set 120. A non-directional filter may be a filter in relation to an image area having a non-directional texture and a directional filter may be a filter in relation to an image area having a directional texture.

Also, the filter selector 102 may select any one of the non-directional filter set 110 and the directional filter set 120 based on a fractional pixel shift and a texture direction of the low-resolution image determined by the texture direction estimator 105.

The texture direction estimator 105 may determine the texture direction of the low-resolution image by using the following method. The texture direction estimator 105 according to an embodiment may estimate a local direction by using a structural tensor. To this end, a symmetric matrix of a 2×2 sized structural tensor may be formed. The symmetric matrix may be formed by a sum of squares of brightness gradients (changes in brightness of a pixel) of vertical and horizontal pixels, and a sum of multiplication of the brightness gradients of the vertical and horizontal pixels, the brightness gradients being calculated in some adjacent areas, as represented in Equation 22.

$$T = \begin{bmatrix} A_{11} & A_{12} \\ A_{12} & A_{22} \end{bmatrix} = \begin{bmatrix} \sum \nabla_x^2 & \sum \nabla_x \nabla_y \\ \sum \nabla_x \nabla_y & \sum \nabla_y^2 \end{bmatrix} \quad \text{[Equation 22]}$$

An eigen value $\lambda_{+/-}$ and an eigen vector $\theta_{+/-}$ of the symmetric matrix of the structural tensor may be calculated as represented in Equation 23.

$$\lambda_{+/-} = \frac{A_{11} + A_{22} \pm \sqrt{D}}{2}, \quad \text{[Equation 23]}$$

-continued $$\theta_{+/-} = \begin{bmatrix} 2A_{12} \\ A_{22} - A_{11} \pm \sqrt{D} \end{bmatrix}$$

In Equation 23, $D = (A_{11} - A_{22})^2 + 4A_{12}^2$. Based on the calculated intrinsic values, a coherence $$c = \left( \frac{\lambda_1 - \lambda_2}{\lambda_1 + \lambda_2} \right)^2$$

may be calculated.

The image processing apparatus 100 may estimate information about a texture area via the coherence. For example, when the coherence does not exceed a certain critical value, the image processing apparatus 100 may estimate that an analyzed point belongs to any one of a weakly textured area and a highly textured area and does not have a texture of one dominant direction. However, this is only an example. As another example, the dominant texture direction may be calculated with respect to a corresponding point. In this case, when a maximum module value is $\lambda_+$, the direction may be calculated based on an equation Drs=arctan $2(2A_{12},A_{22}-A_{11}+\sqrt{D})$. Otherwise, the direction may be calculated based on an equation Drs=arctan $2(2A_{12},A_{22}-A_{11}-\sqrt{D})$.

When processing an RGB image, a gradient may be calculated based on Equation 24.

$$\nabla x = l(y,x+1)-l(y,x-1), \nabla y = l(y+1,x)-l(y-1,x) \qquad \text{[Equation 24]}$$

In Equation 24, l(y,x) indicates a pixel in an image l, the pixel having coordinates x and y.

According to the disclosure, the gradient may be calculated based on the following formula, in order to calculate the structural tensor with respect to the Bayer image.

The gradient of a green channel at points of r and b-types Bayer patterns may be calculated as represented in Equation 25.

$$\nabla x^G = l(y,x+1)-l(y,x-1)$$

$$\nabla y^G = l(y+1,x)-l(y-1,x) \qquad \text{[Equation 25]}$$

The gradient of a blue channel at a point of the r-type Bayer pattern may be calculated as represented in Equation 26.

$$\nabla x^B = \frac{I(y+1,x+1)+I(y-1,x+1)-I(y+1,x-1)-I(y-1,x-1)}{2} \qquad \text{[Equation 26]}$$

$$\nabla y^B = \frac{I(y+1,x+1)+I(y+1,x-1)-I(y-1,x+1)-I(y-1,x-1)}{2}$$

The gradient of a red channel at a point of the r-type Bayer pattern may be calculated as represented in Equation 27.

$$\nabla x^R = \frac{I(y,x+2)-I(y,x-2)}{2} \qquad \text{[Equation 27]}$$

$$\nabla y^R = \frac{I(y+2,x)-I(y-2,x)}{2}$$

The gradient of the red channel at a point of the b-type Bayer pattern may be calculated as represented in Equation 28.

$$\nabla x^R = \frac{I(y+1,x+1)+I(y-1,x+1)-I(y+1,x-1)-I(y-1,x-1)}{2} \qquad \text{[Equation 28]}$$

$$\nabla y^R = \frac{I(y+1,x+1)+I(y+1,x-1)-I(y-1,x+1)-I(y-1,x-1)}{2}$$

The gradient of the blue channel at a point of the b-type Bayer pattern may be calculated as represented in Equation 29.

$$\nabla x^B = \frac{I(y,x+2)-I(y,x-2)}{2} \qquad \text{[Equation 29]}$$

$$\nabla y^B = \frac{I(y+2,x)-I(y-2,x)}{2}$$

The horizontal gradient of the red channel and the vertical gradient of the blue channel at a point of a g1-type Bayer pattern may be calculated as represented in Equation 30.

$$\nabla x^R = l(y,x+1)-l(y,x-1)$$

$$\nabla y^B = l(y+1,x)-l(y-1,x) \qquad \text{[Equation 30]}$$

The horizontal gradient of the blue channel and the vertical gradient of the red channel at a point of a g2-type Bayer pattern may be calculated as represented in Equation 31.

$$\nabla x^B = l(y,x+1)-l(y,x-1)$$

$$\nabla y^R = l(y+1,x)-l(y-1,x) \qquad \text{[Equation 31]}$$

The horizontal gradient of the blue channel and the vertical gradient of the red channel at a point of the g1-type Bayer pattern may be calculated as represented in Equation 32.

$$\nabla x^B = \frac{I(y+1,x+2)+I(y-1,x+2)-I(y+1,x-2)-I(y-1,x-2)}{4} \qquad \text{[Equation 32]}$$

$$\nabla y^R = \frac{I(y+2,x+1)+I(y+2,x-1)-I(y-2,x+1)-I(y-2,x-1)}{4}$$

The horizontal gradient of the red channel and the vertical gradient of the blue channel at a point of the g2-type Bayer pattern may be calculated as represented in Equation 33.

$$\nabla x^R = \frac{I(y+1,x+2)+I(y-1,x+2)-I(y+1,x-2)-I(y-1,x-2)}{4} \qquad \text{[Equation 33]}$$

$$\nabla y^B = \frac{I(y+2,x+1)+I(y+2,x-1)-I(y-2,x+1)-I(y-2,x-1)}{4}$$

The gradient of the green channel at points of the g1 and g2-type Bayer patterns may be calculated as represented in Equation 34.

$$\nabla x^G = \frac{I(y+1,x+1)+I(y-1,x+1)-I(y+1,x-1)-I(y-1,x-1)}{4} + \frac{I(y,x+2)-I(y,x-2)}{4} \qquad \text{[Equation 34]}$$

$$\nabla y^G = \frac{I(y+1,x+1)+I(y+1,x-1)-I(y-1,x+1)-I(y-1,x-1)}{4} + \frac{I(y+2,x)-I(y-2,x)}{4}$$

The gradient of each point of an input image may be calculated as represented in Equation 35.

$$\nabla x = \max(\nabla x^R, \nabla x^G, \nabla x^B), \nabla y = \max(\nabla y^R, \nabla y^G, \nabla y^B) \qquad \text{[Equation 35]}$$

Forming the matrix T and searching the intrinsic vector and the intrinsic value $\lambda_\pm$ thereof may be performed based on substantially the same method as the method with respect to the RGB image. However, before calculating the dominant direction, the image processing apparatus 100 may reduce the vector. This aspect will be described in detail by referring to FIG. 4.

FIG. 4 is a diagram for describing a method of reducing a vector when estimating a texture direction, via the image processing apparatus 100, according to an embodiment.

As illustrated in FIG. 4, the vector may be reduced to a first quadrant 410 or a third quadrant 430 from quadrants 410, 420, 430, and 440. Also, an arctangent calculated from the reduced vector may be quantized via a selected number of levels (for example, N=8, N=16, or N=32) and a unity may be added (0 filter bank is provided in the case of a non-directional texture). A number corresponding to the selected number may be used to specify a number of the filter bank when selecting a filter set with respect to each point.

Referring to FIG. 2 again, the image processing apparatus 100 according to an embodiment may select the filter set based on the texture directionality and the fractional shift set. Also, the image processing apparatus 100 may obtain the RGB high-resolution image 20 based on the selected filter set, the low-resolution image set 10 having a single scene, and an integer shift set.

In order to obtain the high-resolution image, additional constraints, such as noise in the input low-resolution image, an inaccurate estimated value of a pixel shift in some areas of the input low-resolution image, or a significant change (for example, due to an illumination change and residual color artifacts) of an image, may be taken into account. Also, a parameter corresponding to a characteristic of a specific apparatus used to capture the low-resolution image may be taken into account to obtain the high-resolution image.

Figure 3:
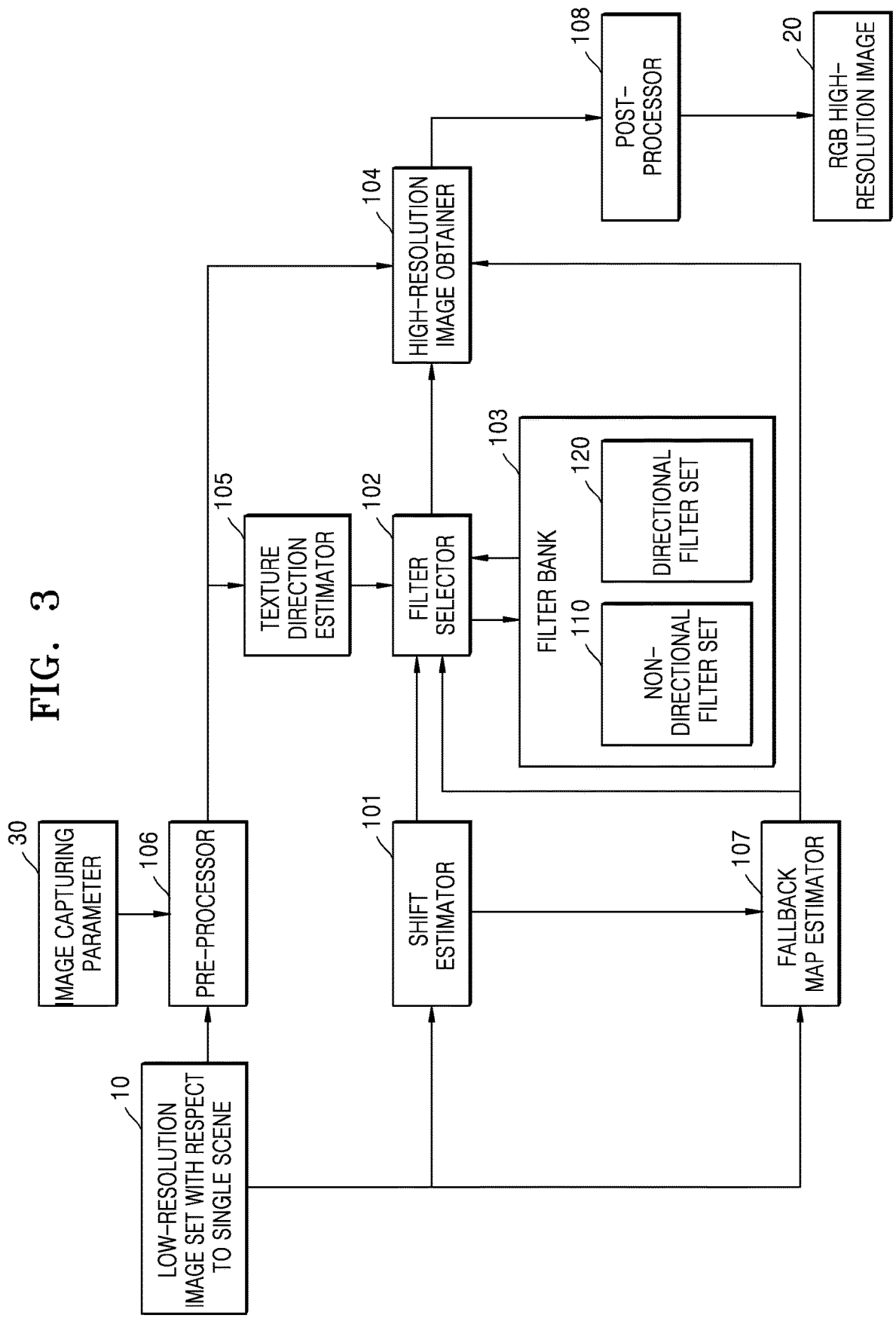
FIG. 3 is a block diagram of an image processing apparatus configured to obtain a high-resolution image from a low-resolution image having a single scene, by taking into account a constraint, such as an estimated value of noise and a pixel shift, etc., according to another embodiment.

FIG. 3 is a block diagram of the image processing apparatus 100 configured to obtain a high-resolution image from a low-resolution image having a single scene, by taking into account a constraint, such as noise, an estimated value of a pixel shift, etc., according to another embodiment.

Referring to FIG. 3, the image processing apparatus 100 may further include a pre-processor 106 configured to perform adaptive noise-reduction (in particular, three-dimensional noise-reduction (3DNR)) by taking into account a parameter for capturing a low-resolution image, in addition to the shift estimator 101, the filter selector 102, the filter bank 103, the high-resolution image obtainer 104, and the texture direction estimator 105 described above with reference to FIG. 1. As another example, the image processing apparatus 100 may further include a fallback map estimator 107 configured to generate a fallback map indicating a fidelity of calculating a pixel shift. The fallback map may be used to detect a pixel having low shift fidelity. As another example, the image processing apparatus 100 may further include a post-processor 108.

The image processing apparatus 100 including the pre-processor 106 and the fallback map estimator 107 may process both an RGB image and a Bayer image.

The shift estimator 101 may not use data obtained after the 3DNR, in order to obtain a more reliable result. The filter bank 103 may be corrected to reconstruct the high-resolution image from k input low-resolution images. For example, the filter bank 103 may be corrected to store filters calculated with respect to k, k−1, k−2, and k1 row resolution images.

When a shift with respect to a current pixel is not reliably calculated with respect to all input low-resolution images included in the low-resolution image set 10 having a single scene, the filter selector 102 may be corrected to select at least one of a plurality of filter sets stored in the filter bank 103, from the low-resolution image, based on a fractional pixel shift, for the reliable calculation of the shift. The filter bank 103 may store the non-directional filter set 110 and the directional filter set 120.

The high-resolution image obtainer 104 may apply a method of obtaining a high-resolution image to a low-resolution image pre-processed by taking into account an image area with respect to a pixel shift is inaccurately calculated. The image area with respect to which the fidelity of the pixel shift is low may be indicated in the fallback map.

When the pixel shift is reliably calculated with respect to all k input low-resolution images, the high-resolution image obtainer 104 may calculate pixels of the high-resolution image from the k low-resolution images, to which the 3DNR is applied, by using a filter with respect to the k images and pixels of the input image.

When it is not the case that the pixel shift is reliably calculated with respect to all k input low-resolution images, the high-resolution image obtainer 104 may select input pixels with respect to which an integer pixel shift is accurately calculated, from the low-resolution image. The high-resolution image obtainer 10 may calculate the pixels of the high-resolution image by applying, to the selected input pixels, the filters obtained by the filter selector 102 for the reconstruction of the high-resolution image from the low-resolution image.

The pre-processor 106 may determine noise-reduction parameters including a noise model, a size of an image portion, a search radius with respect to adjacent image portions, and a relationship between pixel brightness and pixel noise standard deviation, with respect to all pixels in the low-resolution image. Also, the pre-processor 106 may calculate a texture-dependent noise-reduction coefficient based on a change in pixel brightness. Each texture-dependent noise-reduction coefficient may be calculated with respect to each pixel in the low-resolution images.

Also, the pre-processor 106 may estimate a value of the pixel noise standard deviation, by using the relationship between the pixel brightness and the pixel noise standard deviation, the texture-dependent noise-reduction coefficient, and a noise-reduction coefficient set by a user. The pre-processor 106 may execute 3DNR on the low-resolution image set 10 based on the noise-reduction parameters and the estimated value of the pixel noise standard deviation, in order to obtain the low-resolution images having reduced noise.

The texture-dependent noise-reduction coefficients may indicate an estimated image textured level and may indicate areas potentially including high-frequency details which may be reconstructed by a high-resolution operation. In order to guarantee the best visual quality, 3DNR has to be performed on a non-texture area and an area smaller than an area having a dominant direction.

The 3DNR may be performed based on a noise model, such as Gaussian or Poisson, a size of an image portion which is an object of comparison and on which averaging is performed, a search radius R with respect to adjacent portions, and an estimated value of the pixel noise standard deviation at an image point $\sigma(i,j)$. The search radius R with respect to the adjacent portions may be used to determine a maximum distance at which a current portion and a averaged image portion may be arranged. Also, the estimated value of the pixel noise standard deviation may be used to calculate filter weight coefficients applied to calculate a averaged pixel value.

A noise model m, an image portion size r, the search radius R with respect to adjacent portions, and the relationship $\sigma(\bar{I}(i,j))$ between the pixel brightness and the pixel noise standard deviation may be determined based on an exposure time and a gain coefficient GAIN. Here, a relatively greater exposure time and a relatively greater gain coefficient may be applied to the Gaussian model and a smaller radius, and a relatively smaller exposure time and a relatively smaller coefficient may be applied to the Poisson model and a greater radius. However, this is only an example. Detailed application methods may be experimentally derived or may be determined based on correction table data recorded by a camera manufacturer.

The texture-dependent noise-reduction coefficients may be calculated by the following operations.

perform gamma correction of a brightness of a pixel of a low-resolution image, with respect an input image calculate a second intrinsic value $\lambda_-$ of the matrix of the structural tensor T used to estimate the image texture direction, with respect to each pixel of the input low-resolution image perform critical conversion of the second eigen value $\lambda_-$ such that values $\lambda_-$ greater than a first empirically selected critical value are set to be the same as a first critical value and values smaller than a second empirically selected critical value are set to be the same as a second critical value regularize the second eigen value $\lambda$ in order to obtain the value $\lambda$ in a range between 0 and 1. Here, a previous regularization method may be applied.

perform smoothing by filtering the regularized value $\lambda_-$ by a low-frequency filter invert the smoothed value $\lambda_-$. The inverted value $\lambda_-$ corresponds to a texture-dependent noise-reduction coefficient.

The estimated value of the pixel noise standard deviation $\sigma(i,j)$ with respect to each pixel having a coordinate i,j according to an embodiment may be calculated by multiplying a noise-reduction coefficient $k_g$ set by a user, the texture-dependent noise-reduction coefficient k(i,j), and the relationship $\sigma(\tilde{I}(i,j))$ between the pixel brightness and the pixel noise deviation. Also, an average brightness $\tilde{I}(i,j)$ may be calculated based on a previous low-frequency filter.

The noise-reduction coefficient $k_g$ may be used to determine a user preference in terms of a noise-reduction level, storage of a high frequency detail of an image, and a trade off between reconstruction levels. According to an embodiment, the determination of the noise-reduction parameters and the calculation of the texture-dependent noise-reduction coefficients may be performed in the same manner between the RGB low-resolution images and the low-resolution Bayer images.

The 3DNR with respect to the RGB input image may be performed according to a previous method using noise estimation.

With respect to each pixel P0 of the input low-resolution image, a final pixel $\tilde{P0}$ of the low-resolution image to which the 3DNR is applied may be calculated as a sum of weights of the corresponding pixel and an adjacent pixel not distanced from the corresponding pixel by more than R. Also, a separate weight of each pixel Pt adjacent to the pixel P0 may be calculated by an operation, whereby an opposite sign is applied to an exponential function of a square of a distance D(P0,Pt) between portions of the low-resolution image in which the pixels P0 and Pt are arranged, and this is divided by the pixel noise standard deviation $\sigma(i,j)$ and then is divided by a sum of standardized separate weights with respect to all pixels.

When the Gaussian noise model is used according to an embodiment, the distance D(P0,Pt) may be calculated as a sum of a square of a difference between a pixel not distanced from the current pixel P0 by more than 2r and a corresponding pixel arranged at the same distance from the current pixel.

When the Poisson model is used according to another embodiment, the distance D(P0,Pt) may be calculated as a sum of each pixel arranged at the same distance from two factorization functions $f_P(x,y)$ and Pt, with respect to the pixel not distanced from the current pixel P0 by more than 2r. Here, $$f_P(x, y) = x \cdot \log x + y \cdot \log y - (x + y) \cdot \log \frac{x+y}{2} ..$$

The pixel Pt may be obtained from both the current low-resolution image and the input low-resolution image including the low-resolution image from which the pixel P0 is obtained.

The implementation of the 3DNR with respect to the Bayer image may be different from the implementation of the 3DNR with respect to the RGB image in that in the 3DNR with respect to the Bayer image, only pixels included in the same color channel are standardized. In particular, the implementation of the 3DNR with respect to the Bayer image may be different from the implementation of the 3DNR with respect to the RGB image in that in the 3DNR with respect to the Bayer image, only the pixels included in the same color channel are taken into account when calculating the distance D(P0,Pt).

The implementation of the 3DNR with respect to the Bayer image may be different from the implementation of the 3DNR with respect to the RGB image in that in the 3DNR with respect to the Bayer image, only pixels included in the same color channel as the current pixel are used to calculate the average brightness $\tilde{I}(i,j)$. In the calculation of the average brightness according to an embodiment, filtering using a filter $$\begin{bmatrix} 0 & \frac{1}{4} & 0 \\ \frac{1}{4} & 0 & \frac{1}{4} \\ 0 & \frac{1}{4} & 0 \end{bmatrix}$$

may be used, and then, smoothing may be performed by a previous disc-type filter.

The fallback map estimator 107 may generate a fallback map based on a set of low-resolution images and a set of pixel shifts. The fallback map may indicate a fidelity of calculation of the pixel shift.

The image processing apparatus 100 according to an embodiment may use the fallback map, in order to compensate for an error obtained when calculating a pixel shift or a change of a scene, with respect to a scene having a big difference between adjacent low-resolution images. When using the fallback map, only the shift values of the pixels, reliably calculated, may be used to calculate a high-resolution image.

The fallback map M according to an embodiment may have a W×H×k size. Here, W and H indicate the number of pixels in a width direction and a height direction of the high-resolution image, respectively. Here, the high-resolution image may be obtained from input low-resolution images having a W/s×H/s size. Also, k indicates the number of input low-resolution images. Each element of the fallback map may have a value 1 with respect to pixels, when the shift is reliably calculated, and may have a value 0 with respect to pixels, when it is difficult to assure the reliability of the shift. The shift of all pixels of a first low-resolution image may have the value 0, and this may be considered to be reliable.

The fallback map with respect to the input RGB low-resolution images may be calculated by the following operations.

obtain a compensated low-resolution image by compensating the pixel shift by using the pixel shift calculated with respect to the input low-resolution image excluding the first low-resolution image, wherein the compensation of the pixel shift may be performed by a previous method.

perform white balance, gamma correction, Gaussian filtering, and conversion into an LST color space based on $$L = \frac{R+G+B}{3}, S = \frac{R}{2(R+G)}, T = \frac{R}{2(R+B)}$$

with respect to all compensated low-resolution images, wherein the white balance, gamma correction, and Gaussian filtering may be performed based on the previous method.

calculate a Euclidian distance between a pixel of the first low-resolution image in the LST space and a pixel of the compensated low-resolution image in the LST space, in a pixel unit. The calculated Euclidian distance is filtered by using a previous low pass filter and non-linear conversion is performed based on an equation $f(x)=1-x^\gamma$.

calculate a structural similarity (SSIM) index between the first low-resolution image in the LST space and each of k−1 compensated low-resolution images in the LST space in a pixel unit, and set the SSIM index of a pixel having a negative SSIM index value as 0 calculate a value of multiplication of the Euclidian distance filtered and non-linearly converted and the SSIM index, and a value of a sum of the Euclidian distance filtered and non-linearly converted and the SSIM index, with respect to each pixel of the compensated low-resolution image in the LST space. Based on this calculation, an intermediate map including the values calculated with respect to each pixel of the compensated low-resolution images in the LST space and values of pixels of the first low-resolution image, which are set as 1, may be generated, wherein the generated intermediate map has a W/s×H/s×k size.

perform scaling on the intermediate map such that the intermediate map has a W×H×k size.

calculate the fallback map by performing critical conversion on the scaled intermediate map. Here, a value greater than the critical value is assigned as 1, the other values are assigned as 0, and the pixel value of the first low-resolution image is maintained as 1. The critical value may be selected by a user to reflect a pixel shift calculation error which is deemed by the user as not acceptable.

The calculation of the fallback map with respect to the Bayer image may include the following different operations in terms of the compensation of the pixel shift, compared to the calculation of the fallback map with respect to the RGB image.

For example, as illustrated in FIG. 5, pixels of an original Bayer image 510 corresponding to the input low-resolution image are divided into separate color channels G1 (520), G2 (530), R (540), and B (550)

sum the pixels of the color channels G1 and G2 having the same location in all of the input low-resolution images, and divide the sum of the pixels of the color channels G1 and G2 by 2 to obtain a channel G.

The rest of the operations for calculating the fallback map with respect to the Bayer image may be the same as the operations for calculating the fallback map with respect to the RGB image.

The texture direction estimator 105 according to an embodiment may determine the texture direction of the noise-reduced low-resolution image obtained from the pre-processor 106.

The filter selector 102 according to an embodiment may select any one of the non-directional filter set and the directional filter set based on the fallback map, the fractional pixel shift set, and the texture direction in the noise-reduced low-resolution image.

Also, the high-resolution image obtainer 104 according to an embodiment may obtain the RGB high-resolution image by calculating the pixel of the high-resolution image by using the fallback map, the noise-reduced low-resolution image set, the selected filter set, and the integer pixel shift set.

The operation of obtaining the high-resolution image by using the fallback map and the noise-reduced (3DNR-applied) low-resolution image set may correspond to the operation of the high-resolution image obtainer 104 described above.

In order to filter a color artifact remaining in the high-resolution image, the image processing apparatus 100 configured to process high-resolution data may further include the post-processor 108. The post-processor 108 may convert the RGB high-resolution image obtained by the high-resolution image obtainer 104 into a YUV image.

Also, the post-processor 108 may process the YUV image as follows.

calculate a map of pixel standard deviations of a channel Y based on a sliding window method calculate a reference channel Ref with respect to cross bilateral filtering by performing smoothing on the map of pixel standard deviations by using Gaussian filtering and perform cross bilateral filtering on a channel U and a channel V by using the reference channel Ref reversely convert the processed YUV image into the post-processed RGB high-resolution image The image processing method according to an embodiment aims to obtain a high-resolution image from a set of low-resolution images with respect to a single scene. The image processing method according to an embodiment may be performed on both the input RGB image and the input Bayer image and may not require a demosaicing operation to convert the Bayer image into the RGB image. The image processing method may be performed by the image processing apparatus 100 described above. The operations performed by the image processing apparatus 100 may correspond to the operations performed in an image processing method to be described below by referring to FIG. 6.

Figure 6:
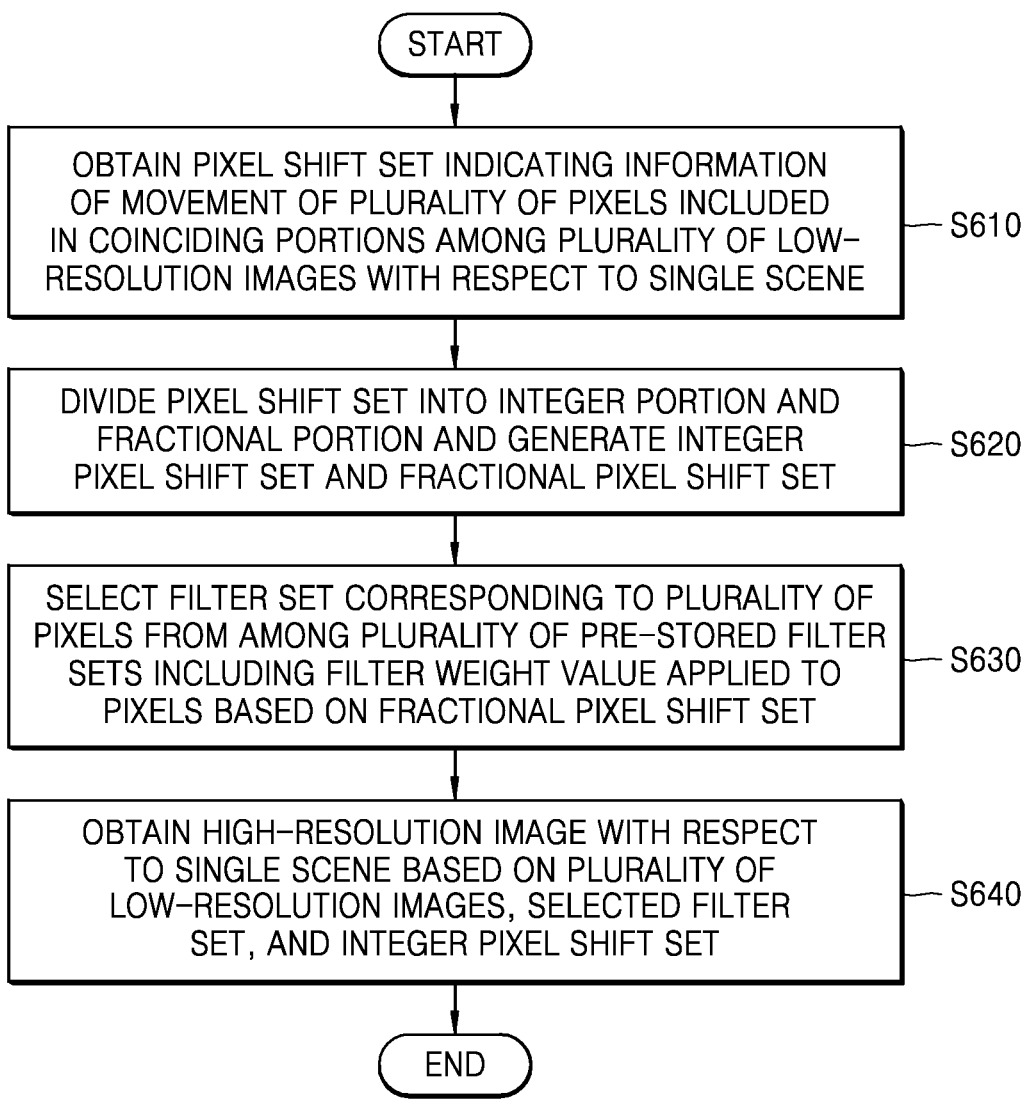
FIG. 6 is a flowchart of a method of processing an image, according to an embodiment.

FIG. 6 is a flowchart of an image processing method according to an embodiment.

In operation S610, the image processing apparatus may obtain a pixel shift set indicating information of movement of a plurality of pixels included in coinciding portions among a plurality of low-resolution images with respect to a single scene.

The image processing apparatus according to an embodiment may obtain a pixel shift set with respect to both of a plurality of low-resolution images having an RGB format and a plurality of low-resolution images having a Bayer format.

Also, the image processing apparatus according to another embodiment may obtain the pixel shift set from a plurality of noise-reduced low-resolution images. Here, a method of obtaining the plurality of noise-reduced low-resolution images via the image processing apparatus may correspond to the method of obtaining the plurality of noise-reduced low-resolution images via the image processing apparatus 100 described above with reference to FIG. 3.

In operation S620, the image processing apparatus may divide the pixel shift set into an integer portion and a fractional portion, and may generate an integer pixel shift set and a fractional pixel shift set.

The image processing apparatus according to an embodiment may select a limited number of fractional shifts having values within a predetermined range, from among a plurality of fractional shifts of a plurality of pixels. The image processing apparatus may generate the fractional pixel shift set by combining the selected fractional pixel shifts.

In operation S630, the image processing apparatus may select a filter set corresponding to a plurality of pixels from among a pre-stored plurality of filter sets including filter weight values applied to pixels, based on the fractional pixel shift set.

The image processing apparatus according to an embodiment may select the filter set corresponding to the plurality of pixels from among the pre-stored plurality of filter sets, based on the fractional pixel shift set and a pre-set regularizer. The regularizer may be used to apply constraints added for obtaining the high-resolution image. Also, the plurality of filer sets according to an embodiment may be stored in a filter bank. The number of the pre-stored filter sets may be determined based on at least one pixel shift coincidence property of the plurality of pixels included in the coinciding portions among the plurality of low-resolution images. Here, the coincidence property may correspond to each of the coincidence properties of the plurality of pixel shifts, described above with reference to FIG. 1.

The image processing apparatus according to another embodiment may select the filter set based on whether or not a texture of the coinciding portions among the plurality of low-resolution images has directionality, and based on the fractional pixel shift set.

The image processing apparatus according to another embodiment may select the filter set corresponding to the plurality of pixels from among the pre-stored filter sets, based on the fallback map, the fractional pixel shift set, and the texture direction.

In operation S640, the image processing apparatus may obtain the high-resolution image with respect to the single scene, based on the plurality of low-resolution images, the selected filter set, and the integer pixel shift set.

The image processing apparatus according to an embodiment may perform post-processing to remove color artifacts remaining in the obtained high-resolution image of the RGB format. For example, the image processing apparatus may convert the high-resolution image having the RGB image format into an YUV image. The image processing apparatus may obtain a pixel standard deviation map with respect to a channel Y with respect to the YUV image. The image processing apparatus may perform cross bilinear filtering on a channel U and a channel V based on a reference channel obtained by performing smoothing on the pixel standard deviation map. The image processing apparatus may obtain the post-processed high-resolution image by converting the YUV image, on which cross bilinear filtering is performed, into the format of the RGB image.

Figure 7:
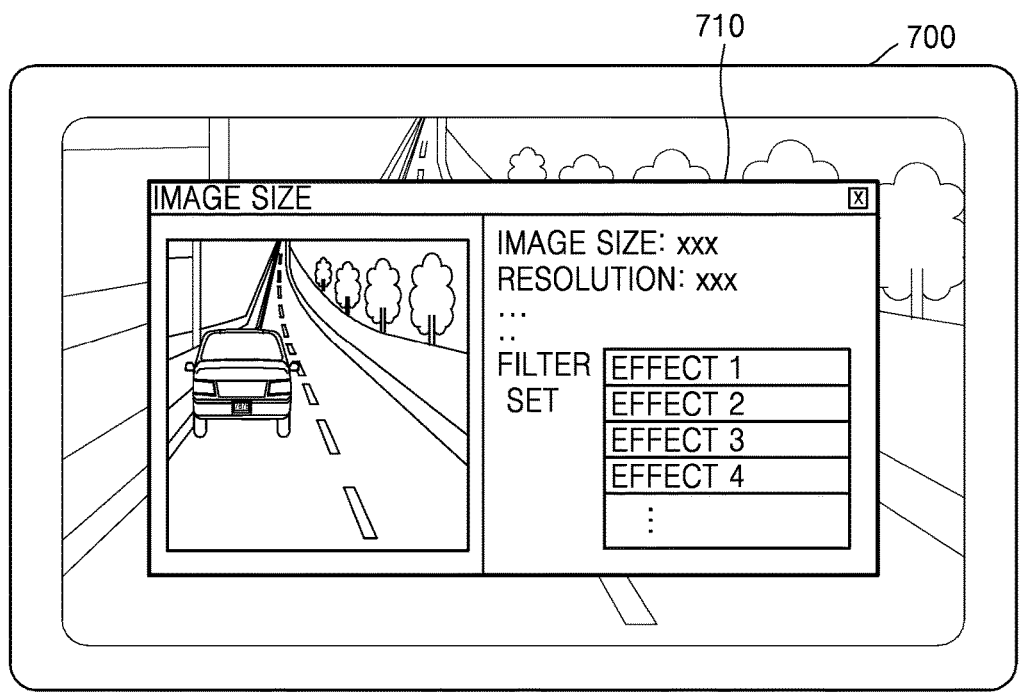
FIG. 7 is a diagram for describing a method of selecting a filter set based on user selection via an image processing apparatus, according to an embodiment.

FIG. 7 is a diagram for describing a method of selecting a filter set based on user selection via an image processing apparatus 700, according to an embodiment.

Referring to FIG. 7, the image processing apparatus 700 may determine the filter set used to obtain a high-resolution image from a plurality of low-resolution images with respect to a single scene, based on the selection of the user.

For example, the image processing apparatus 700 may display, on a display thereof, a list 710 on which an effect corresponding to each of a plurality of filter sets is disclosed, so that the user may select any one of the plurality of filter sets, which corresponds to the fractional pixel shift. Here, based on each effect, at least one of a color, edge, saturation, brightness, color temperature, blur, sharpness, and contrast may be different. When the user selects one of the plurality of effects disclosed on the list 710 in order to apply the effect preferred by the user when obtaining the high-resolution image, a filter set corresponding to the selected effect may be selected.

However, this is only an example. Identification information of the filter set may be directly displayed or a pre-view image with respect to the high-resolution image to be generated when each of the filter sets is applied may be displayed, on the list 710.

The image processing apparatus 700 may determine at least one filter set which is appropriate to obtain the high-resolution image by taking into account attributes of the plurality of low-resolution images, and may display the determined at least one filter set on the list 710. The image processing apparatus 700 may recommend at least one filter set by taking into account the fractional pixel shift set in the plurality of low-resolution images, and ultimately select the filter set based on the selection of the user, thereby selecting the filter set reflecting both the user preference and the attributes of the low-resolution images.

Also, according to another example, the image processing apparatus 700 may recommend at least one filter set based on the fractional pixel shift set and texture directionality.

According to another example, the image processing apparatus 700 may display, on the list 710, the filter set selected based on history information of at least one filter set previously selected by the user. For example, the image processing apparatus 700 may display the filter set, the selected number of which is equal to or greater than a predetermined value, on the list 710. Here, the filter set which is selected many times by the user may be located on a top end of the list 710.

Also, the image processing apparatus 700 may determine the filter set displayed on the list 710 by using history information with respect to each low-resolution image set. The low-resolution image sets may include a sports image, a drama image, a game image, etc. The low-resolution image sets may be classified according to a type, motion, etc. of an object included in the low-resolution image sets. However, the low-resolution image sets are not limited thereto. The image processing apparatus 700 may display the filter set previously selected many times by the user on the top end of the list 710, with respect to the low-resolution image sets. For example, when the obtained low-resolution image set corresponds to a sports image, the image processing apparatus 700 may display a filter set, the selected number of which is equal to or greater than a predetermined value, based on history information of filter sets previously selected by the user with respect to the sports image, on the top end of the list 710.

The image processing apparatus 700 according to an embodiment may display the high-resolution image obtained from the plurality of low-resolution images based on the filter set selected by the user, on a screen of the image processing apparatus 700 or a screen of an external apparatus.

Figure 8:
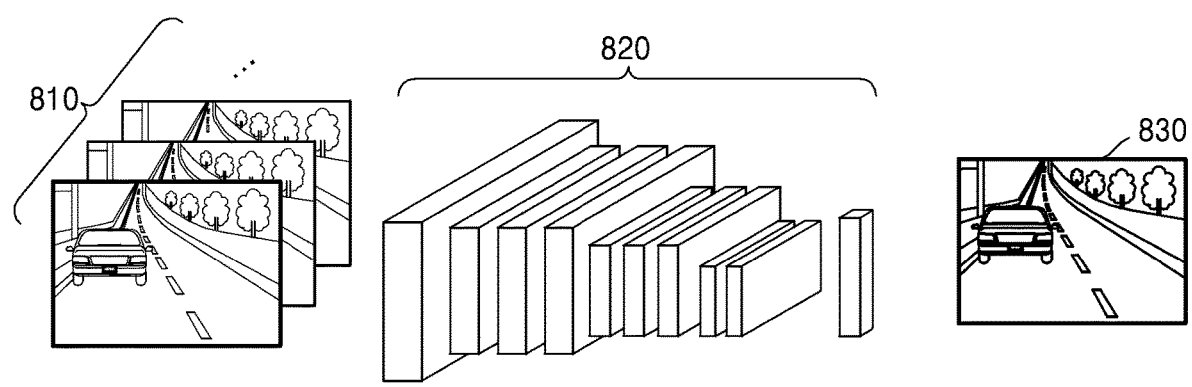
FIG. 8 is a diagram for describing a method of obtaining a high-resolution image from a low-resolution image having a single scene, by using a learning network model, via an image processing apparatus, according to an embodiment.

FIG. 8 is a diagram for describing a method of obtaining a high-resolution image 830 from a plurality of low-resolution images 810 having a single scene by using a learning network model 820, via an image processing apparatus, according to an embodiment.

Referring to FIG. 8, the image processing apparatus may store the learning network model 820, which is pre-generated. However, this is only an example, and the learning network model 820 may be stored in an external apparatus. This aspect will be described in detail below by referring to FIG. 13.

The image processing apparatus obtains the high-resolution image 830 from the low-resolution images 810 having the single scene by using the learning network model 820 may denote that the image processing apparatus determines a filter set applied to a fractional pixel shift set, based on a result of using the learning network model 820. To this end, the image processing apparatus may train the learning network model 820 by repeatedly training the learning network model 820 with respect to the filter set corresponding to the fractional pixel shift set, and/or analyzing and/or evaluating non-instructed learned results.

Also, as another example, the image processing apparatus may train the learning network model 820 according to the method described above, by taking into account texture directionality in addition to the fractional pixel shift.

When there is a high-resolution image, a plurality of low-resolution images for training the learning network model 820 may be obtained from the high-resolution image by performing conversion and continuous down-sampling. For example, the plurality of low-resolution images for the training may be obtained from the high-resolution image pre-obtained based on Equation 1 described above.

The image processing apparatus according to an embodiment may output a probability of each filter set appropriate to obtain the high-resolution image 830 from the plurality of low-resolution images 810, via the learning network model 820. The image processing apparatus may display the filter sets having the output probability values equal to or higher than a critical value, on a screen. Here, a user may select any one of the filter sets displayed on the screen. However, this is only an example. According to another example, the image processing apparatus may generate the high-resolution image by using the filter set having the highest output probability value, and may display the generated high-resolution image on the screen.

According to another embodiment, the image processing apparatus may train the learning network model 820 to determine the filter set by taking into account types of the plurality of low-resolution images 810. For example, the image processing apparatus may input each low-resolution image set in the learning network model 820 and train the learning network model 820 to output a filter set preferred by a user. Accordingly, the image processing apparatus may obtain the output filter set preferred by the user with respect to a newly obtained low-resolution image set, by using the learning network model 820.

Figure 9:
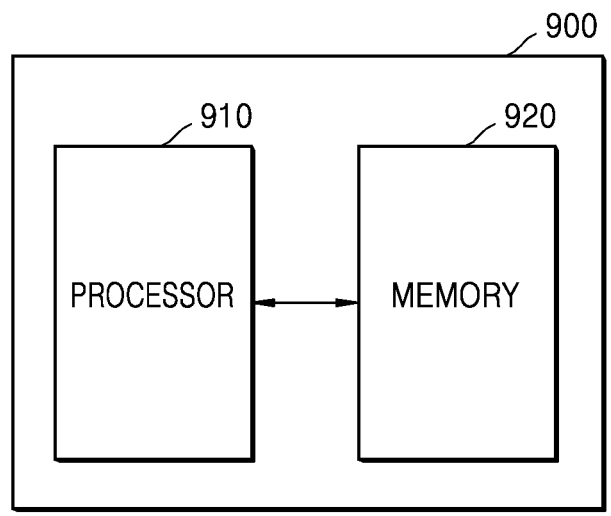
FIG. 9 is a block diagram of an image processing apparatus configured to obtain a high-resolution image from a low-resolution image having a single scene, according to another embodiment.

FIG. 9 is a block diagram of an image processing apparatus 900 configured to obtain a high-resolution image from a plurality of low-resolution images with respect to a single scene, according to another embodiment.

Referring to FIG. 9, the image processing apparatus 900 may include at least one processor 910 and a memory 920. However, this is only an embodiment, and components of the image processing apparatus 900 are not limited thereto.

The at least one processor 910 according to an embodiment may perform the operations of the shift estimator 101, the filter selector 102, the filter bank 103, and the high-resolution image obtainer 104, described above with reference to FIG. 1.

Also, according to another embodiment, the at least one processor 910 may perform the operations of the shift estimator 101, the filter selector 102, the filter bank 103, the high-resolution image obtainer 104, and the texture direction estimator 105, described above with reference to FIG. 2.

According to another embodiment, the at least one processor 910 may perform the operations of the shift estimator 101, the filter selector 102, the filter bank 103, the high-resolution image obtainer 104, the texture direction estimator 105, the pre-processor 106, the fallback map estimator 107, and the post-processor 108, described above with reference to FIG. 3.

For example, the at least one processor 910 may obtain a pixel shift set indicating information of movement of a plurality of pixels included in coinciding portions among the plurality of low-resolution images having the single scene. Also, the at least one processor 910 may generate an integer pixel shift set and a fractional pixel shift set by dividing the pixel shift set into an integer portion and a fractional portion. The at least one processor 910 may select a filter set corresponding to the plurality of pixels from among a plurality of pre-stored filter sets including a filter weight value applied to the pixels, based on the fractional pixel shift set. Also, the at least one processor 910 may obtain the high-resolution image with respect to the single scene, based on the plurality of low-resolution images, the selected filter set, and the integer pixel shift set.

The memory 920 may store programs (one or more instructions) for processing and controlling of the at least one processor 910. The programs stored in the memory 920 may be divided into a plurality of modules based on functions.

The memory 920 according to an embodiment may include a software module including a data learner 1010 and a data recognizer 1020 to be described below with reference to FIG. 10. Also, each of the data learner 1010 and the data recognizer 1020 may include a learning network model, or the data learner 1010 and the data recognizer 1020 may share one learning network model.

Figure 10:
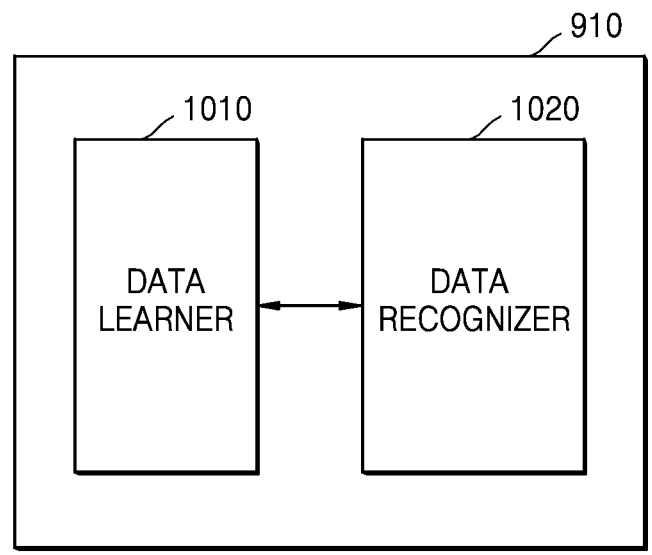
FIG. 10 is a diagram for describing at least one processor according to an embodiment.

FIG. 10 is a diagram for describing the at least one processor 910 according to an embodiment.

Referring to FIG. 10, the at least one processor 910 according to an embodiment may include the data learner 1010 and the data recognizer 1020.

The data learner 1010 may learn a reference to determine the filter set with respect to the fractional pixel shift of the plurality of low-resolution images. Also, according to another embodiment, the data learner 1010 may learn the reference to determine the filter set corresponding to the fractional pixel shift set based on information about a filter set selected by a user to obtain a high-resolution image from the plurality of low-resolution images and information of attributes of the plurality of low-resolution images. Here, the attribute information may include a color, edge, a polygon, saturation, brightness, color temperature, blur, sharpness, contrast, etc., included in an image, but the attribute information is not limited thereto.

The data recognizer 1020 may determine the filter set corresponding to the fractional pixel shift set of the plurality of low-resolution images, based on the reference learned by the data learner 1010.

At least one of the data learner 1010 and the data recognizer 1020 may be manufactured in the form of at least one hardware chip and may be mounted in the image processing apparatus. For example, at least one of the data learner 1010 and the data recognizer 1020 may be manufactured as an exclusive hardware chip for artificial intelligence (AI) or may be manufactured as part of a previous general processor (for example, a central processor (CPU) or an application processor) or a graphics exclusive processor (for example, a graphics processor (GPU)) and mounted in various image processing apparatuses described above.

In this case, the data learner 1010 and the data recognizer 1020 may be mounted in one image processing apparatus, or may be mounted in each different image processing apparatus. For example, one of the data learner 1010 and the data recognizer 1020 may be included in an image processing apparatus and the other may be included in a server. Also, the data learner 1010 and the data recognizer 1020 may be connected wirelessly or via wires, so that model information generated by the data learner 1010 may be provided to the data recognizer 1020, or data input in the data recognizer 1020 may be provided to the data learner 1010 as additional learning data.

At least one of the data learner 1010 and the data recognizer 1020 may be implemented as a software module. When at least one of the data learner 1010 and the data recognizer 1020 is implemented as a software module (or a program module including instructions), the software module may be stored in a non-transitory computer readable recording medium. Also, in this case, one or more software modules may be provided by an operating system (OS) or by a certain application. Alternatively, some of the one or more software modules may be provided by the OS and the others may be provided by a certain application.

Figure 11:
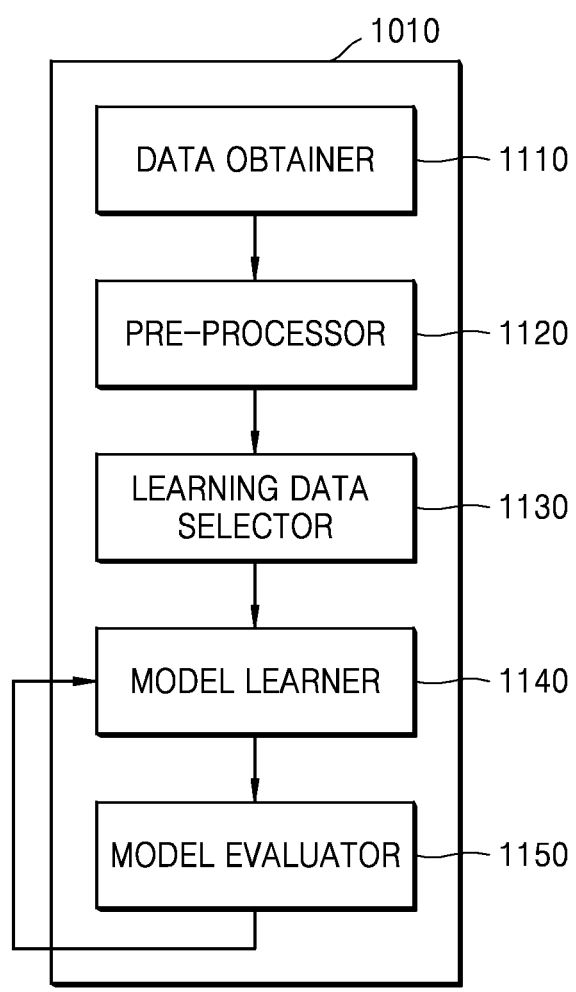
FIG. 11 is a block diagram of a data learner according to an embodiment.

FIG. 11 is a block diagram of the data learner 1010 according to an embodiment.

Referring to FIG. 11, the data learner 1010 according to an embodiment may include a data obtainer 1110, a pre-processor 1120, a learning data selector 1130, a model learner 1140, and a model evaluator 1150. However, this is only an embodiment, and the data learner 1010 may include less components than the described components, or may include additional components in addition to the described components.

The data obtainer 1110 may obtain a plurality of low-resolution image sets as learning data. For example, the data obtainer 1110 may obtain at least one image from an image processing apparatus including the data learner 1010 or an external apparatus capable of communicating with the image processing apparatus including the data learner 1010.

The pre-processor 1120 may perform pre-processing, such as removing noise of each of the plurality of low-resolution image sets. Also, the pre-processor 1120 may process the obtained low-resolution image sets in a pre-set format, so that the model learner 1140 to be described below may use the obtained low-resolution image sets for learning.

The learning data selector 1130 may select a low-resolution image which is necessary for learning, from among the pre-processed data. The selected low-resolution image may be provided to the model learner 1140. The learning data selector 1130 may select the image which is necessary for learning, from the pre-processed image, based on a reference which is set.

The model learner 1140 may learn a reference with respect to which information to use in the low-resolution image, by a plurality of layers in a learning network model, in order to determine the filter set with respect to the fractional pixel shift set.

Also, the model learner 1140 may train a data recognition model, for example, through reinforcement learning using feedback with respect to whether an image quality of an obtained high-resolution image is proper.

Also, when the data recognition model is learned, the model learner 1140 may store the learned data recognition model.

The model evaluator 1150 may input evaluation data in the learning network model, and when a recognition result output from the evaluation data does not satisfy a certain reference, may cause the model learner 1140 to learn again. In this case, the evaluation data may be data that is pre-set to evaluate the learning network model.

At least one of the data obtainer 1110, the pre-processor 1120, the learning data selector 1130, the model learner 1140, and the model evaluator 1150 in the data learner 1010 may be manufactured in the form of at least one hardware chip and mounted in the image processing apparatus. For example, at least one of the data obtainer 1110, the pre-processor 1120, the learning data selector 1130, the model learner 1140, and the model evaluator 1150 may be manufactured as an exclusive hardware chip for AI or may be manufactured as part of a previous general processor (for example, a CPU or an application processor) or a graphics exclusive processor (for example, a GPU) and mounted in various image processing apparatuses described above.

Also, the data obtainer 1110, the pre-processor 1120, the learning data selector 1130, the model learner 1140, and the model evaluator 1150 may be mounted in one image processing apparatus, or may be mounted in each different image processing apparatus. For example, some of the data obtainer 1110, the pre-processor 1120, the learning data selector 1130, the model learner 1140, and the model evaluator 1150 may be included in the image processing apparatus and the others may be included in a server.

Also, at least one of the data obtainer 1110, the pre-processor 1120, the learning data selector 1130, the model learner 1140, and the model evaluator 1150 may be implemented as a software module. When at least one of the data obtainer 1110, the pre-processor 1120, the learning data selector 1130, the model learner 1140, and the model evaluator 1150 is implemented as a software module (or a program module including instructions), the software module may be stored in a non-transitory computer readable recording medium. Also, in this case, one or more software modules may be provided by an OS or by a certain application. Alternatively, some of the one or more software modules may be provided by the OS and the others may be provided by a certain application.

Figure 12:
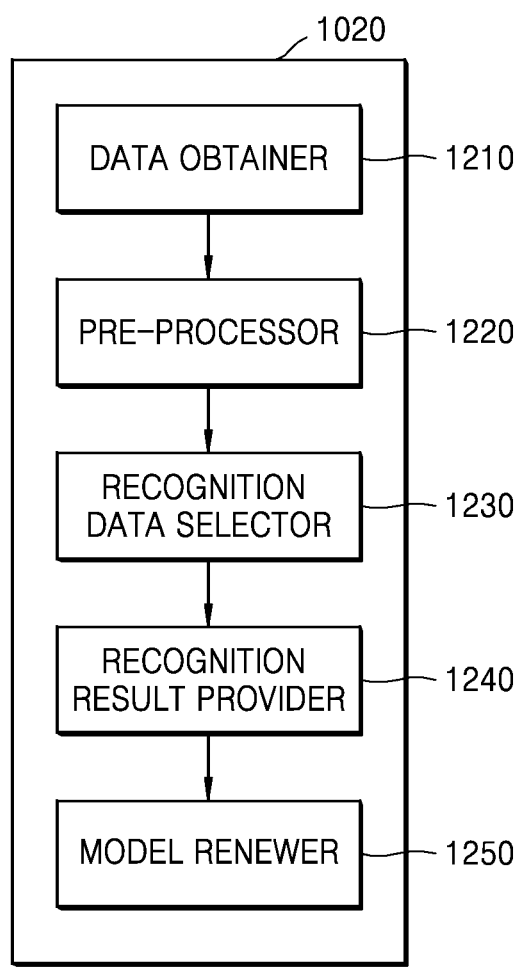
FIG. 12 is a block diagram of a data recognizer according to an embodiment.

FIG. 12 is block diagram of the data recognizer 1020 according to an embodiment.

Referring to FIG. 12, the data recognizer 1020 according to an embodiment may include a data obtainer 1210, a pre-processor 1220, a recognition data selector 1230, a recognition result provider 1240, and a model renewer 1250.

The data obtainer 1210 may obtain a plurality of low-resolution image sets and the pre-processor 1220 may pre-process the obtained plurality of low-resolution image sets. The pre-processor 1220 may process the obtained low-resolution image sets in a pre-set format, so that the recognition result provider 1240 to be described below may use the obtained plurality of low-resolution image sets in order to determine a filter set with respect to a fractional pixel shift set. The recognition data selector 1230 may select a low-resolution image which is necessary to determine the filter set with respect to the fractional pixel shift set, from the pre-processed data. The selected low-resolution image may be provided to the recognition result provider 1240.

The recognition result provider 1240 may determine the filter set with respect to the fractional pixel shift set used to obtain the high-resolution image, based on the selected low-resolution image. Also, the recognition result provider 1240 may provide information about the determined filter set to the model renewer 1250.

The model renewer 1250 may provide the information about evaluation of the determined filter set to the model learner 1140 described above with reference to FIG. 11, so that parameters of layers, etc. included in the learning network model are renewed based on the evaluation with respect to the filter set, provided by the recognition result provider 1240.

At least one of the data obtainer 1210, the pre-processor 1220, the recognition data selector 1230, the recognition result provider 1240, and the model renewer 1250 in the data recognizer 1020 may be manufactured in the form of at least one hardware chip and mounted in an image processing apparatus. For example, at least one of the data obtainer 1210, the pre-processor 1220, the recognition data selector 1230, the recognition result provider 1240, and the model renewer 1250 may be manufactured as an exclusive hardware chip for AI or may be manufactured as part of a previous general processor (for example, a CPU or an application processor) or a graphics exclusive processor (for example, a GPU) and mounted in various image processing apparatuses described above.

Also, the data obtainer 1210, the pre-processor 1220, the recognition data selector 1230, the recognition result provider 1240, and the model renewer 1250 may be mounted in one image processing apparatus, or may be mounted in each different image processing apparatus. For example, some of the data obtainer 1210, the pre-processor 1220, the recognition data selector 1230, the recognition result provider 1240, and the model renewer 1250 may be included in the image processing apparatus and the others may be included in a server.

Also, at least one of the data obtainer 1210, the pre-processor 1220, the recognition data selector 1230, the recognition result provider 1240, and the model renewer 1250 may be implemented as a software module. When at least one of the data obtainer 1210, the pre-processor 1220, the recognition data selector 1230, the recognition result provider 1240, and the model renewer 1250 is implemented as a software module (or a program module including instructions), the software module may be stored in a non-transitory computer readable recording medium. Also, in this case, one or more software modules may be provided by an OS or by a certain application. Alternatively, some of the one or more software modules may be provided by the OS and the others may be provided by a certain application.

Figure 13:
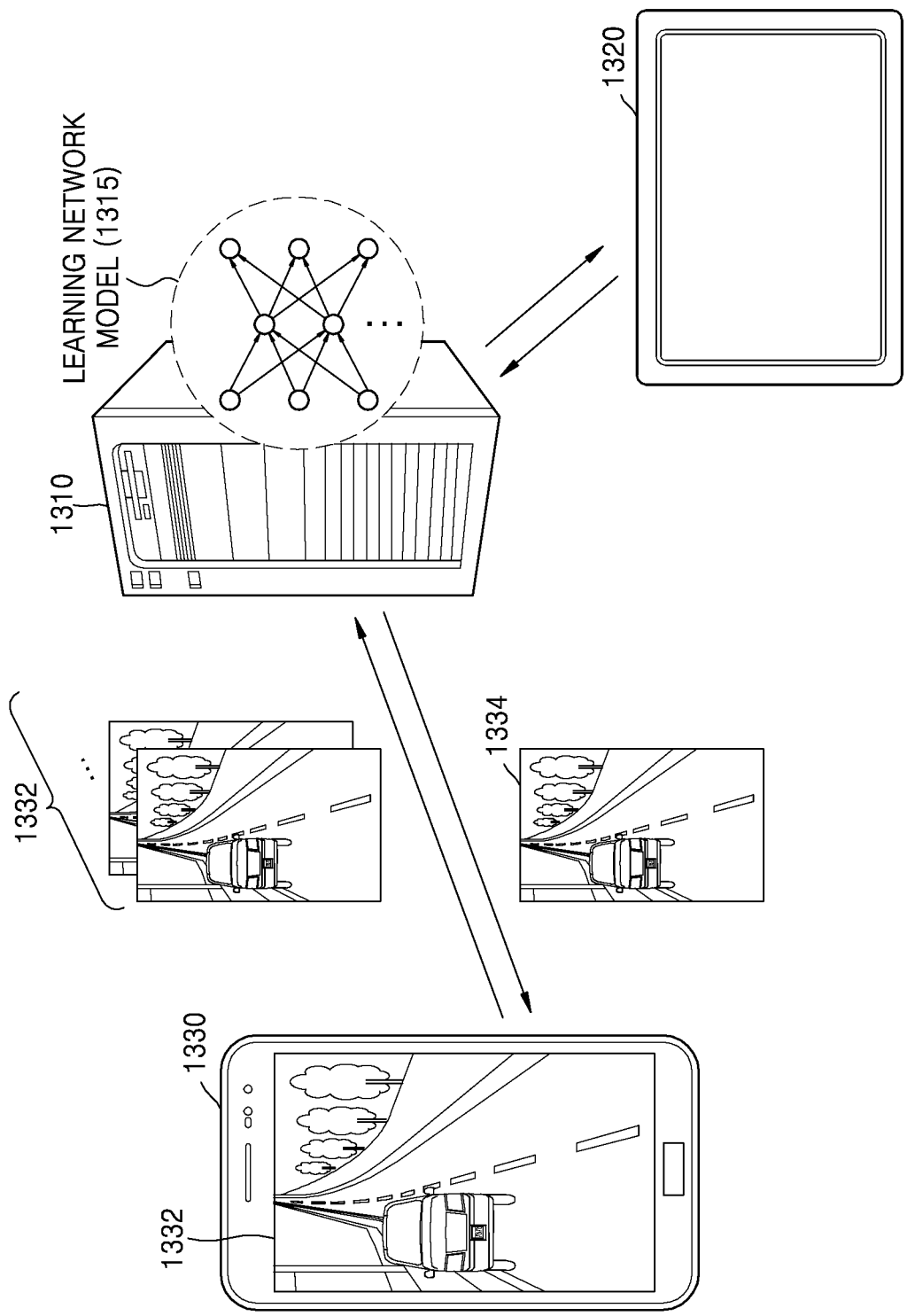
FIG. 13 is a diagram for describing a method of obtaining a high-resolution image from a plurality of low-resolution images by using a learning network model provided in a server, via an image processing apparatus, according to an embodiment.

FIG. 13 is a diagram for describing a method of obtaining a high-resolution image 1334 from a plurality of low-resolution images 1332 by using a learning network model 1315 provided in a server 1310, via a first image processing apparatus 1320 or a second image processing apparatus 1330, according to an embodiment.

Referring to FIG. 13, the learning network model 1315 used to determine a filter set to obtain the high-resolution image 1334 from the plurality of low-resolution images 1332 may be stored in the server 1310. Here, the learning network model 1315 may correspond to the learning network model 820 described above with reference to FIG. 8.

When a user uses the plurality of image processing apparatuses 1320 and 1330, the user may download the learning network model 1315 from a learning network model stored in the server 1310 or receive information about the filter set determined based on the learning network model 1315, so as to obtain the high-resolution image 1334 from the plurality of low-resolution images 1332.

The server 1310 may train the learning network model 1315 to reflect a user preference when determining the filter set based on information about filter sets previously selected by the user. Accordingly, both when the user determines the filter set by using the first image processing apparatus 1320 and when the user determines the filter set by using the second image processing apparatus 1330, the user may use the learning network model 1315 stored in the server 1310, so as to determine the filter set reflecting the user preference, even when the apparatus is changed.

Also, according to another embodiment, the server 1310 may store configuration information for removing noise described above with reference to FIG. 3. For example, when the plurality of low-resolution images 1332 are received from the second image processing apparatus 1330, the server 1310 may perform pre-processing with respect to the received plurality of low-resolution images 1332, based on the configuration information for removing noise stored in the server 1310.

The server 1310 may include a computing device configured to provide service to the first and second image processing apparatuses 1320 and 1330. For example, the server 1310 may include a personal computer (PC), a laptop, a micro server, and other mobile or non-mobile devices. However, the server 1310 is not limited thereto, and may include all types of apparatuses having a communication function and a data processing function.

The image processing method according to an embodiment may be applied to various image capturing systems having one or more cameras including a system configured to support a bust shot function. Embodiments may be applied for "digital zooming" and mega pixel image multiplication (Mpx) in a general camera use scenario. The embodiments may be applied in application fields requiring optical character recognition (OCR). Also, the embodiments may be implemented as a general-purpose processor, software using a digital signal processor (DSP) and/or a CPU, or partially as a system on chip (SoC). As another example, the embodiments may be implemented as an additional device or part of an image signal processor (ISP).

The method according to an embodiment may be implemented as computer instructions which may be executed by various computer means, and recorded on a non-transitory computer-readable recording medium. The non-transitory computer-readable recording medium may include program commands, data files, data structures, or a combination thereof. The program commands recorded on the non-transitory computer-readable recording medium may be specially designed and constructed for the disclosure or may be known to and usable by one of ordinary skill in a field of computer software. Examples of the non-transitory computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices (e.g., ROMs, RAMs, or flash memories) which are specially configured to store and carry out program commands. Examples of the program commands include a high-level programming language code to be executed in a computer by using an interpreter as well as a machine language code made by a compiler.

For the purposes of promoting an understanding of the principles of the disclosure, reference has been made to the example embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art.

The disclosure may be described in terms of functional block components and various processing steps. Such functional blocks may be realized by any number of hardware and/or software components configured to perform the specified functions. For example, the disclosure may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements, the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the disclosure could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical."

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of processing an image, the method comprising:
    obtaining a pixel shift set indicating information of movement of a plurality of pixels included in coinciding portions among a plurality of low-resolution images with respect to a single scene;
    dividing the pixel shift set into an integer portion and a fractional portion;
    generating an integer pixel shift set and a fractional pixel shift set;
    identifying a texture coherence value of at least one of the plurality of low-resolution images;
    selecting a non-directional filter set or a directional filter set corresponding to the plurality of pixels from among a plurality of pre-stored filter sets including a filter weight value applied to the pixels, based on the identified texture coherence value and the fractional pixel shift set; and
    obtaining a high-resolution image with respect to the single scene, based on the plurality of low-resolution images, the selected filter set, and the integer pixel shift set.

2. The method of claim 1, wherein the generating of the fractional pixel shift set comprises:
    selecting fractional shift values, each corresponding to a value within a pre-set range of fractional shift values; and
    generating the fractional pixel shift set by combining the selected fractional shift values.

3. The method of claim 1, wherein the selecting of the filter set comprises:
    selecting the filter set corresponding to the plurality of pixels from among the plurality of pre-stored filter sets, based on the fractional pixel shift set and a pre-set regularizer.

4. The method of claim 1, wherein a number of the plurality of pre-stored filter sets is determined based on at least one pixel shift coincidence property of the plurality of pixels included in the coinciding portions.

5. The method of claim 1, further comprising:
    determining a noise-reduction parameter with respect to the pixels of the plurality of low-resolution images, the noise-reduction parameter including a noise model, a size of the coinciding portions, a search radius with respect to adjacent image portions, and a relationship between a pixel brightness and a pixel noise standard deviation;
    obtaining a texture-dependent noise-reduction coefficient based on a change in brightness of the pixels of the plurality of low-resolution images;
    determining an estimated value of the pixel noise standard deviation, using a relationship between the pixel brightness and the pixel noise standard deviation, the texture-dependent noise-reduction coefficient, and a noise-reduction coefficient; and
    obtaining a plurality of noise-reduced low-resolution images by performing a three-dimensional noise-reduction operation on the plurality of low-resolution images, based on the noise-reduction parameter and the estimated value of the pixel noise standard deviation, wherein the pixel shift set is obtained from the plurality of noise-reduced low-resolution images.

6. The method of claim 5, further comprising:
generating a fallback map indicating a fidelity of pixel shift values included in the pixel shift set, based on the pixel shift set; and
determining a texture direction of the plurality of noise-reduced low-resolution images,
wherein the selecting of the filter set includes selecting the filter set corresponding to the plurality of pixels from among the plurality of pre-stored filter sets, based on the fallback map, the fractional pixel shift set, and the texture direction.

7. The method of claim 1, wherein the plurality of low-resolution images with respect to the single scene comprise RGB images.

8. The method of claim 1, wherein the plurality of low-resolution images with respect to the single scene comprise Bayer images.

9. The method of claim 7, further comprising:
converting the high-resolution image having a format of an RGB image into a YUV image;
obtaining, with respect to the YUV image, a pixel standard deviation map with respect to channel Y;
performing cross bilinear filtering on channel U and channel V, based on a reference channel obtained by performing smoothing on the pixel standard deviation map; and
obtaining the high-resolution image post-processed by converting the YUV image, to which the cross bilinear filtering is applied, into the format of the RGB image.

10. An apparatus for processing an image, the apparatus comprising:
at least one processor; and
a memory storing one or more instructions that, when executed by the at least one processor, cause the apparatus to:
obtain a pixel shift set indicating information of movement of a plurality of pixels included in coinciding portions among a plurality of low-resolution images with respect to a single scene;
divide the pixel shift set into an integer portion and a fractional portion;
generate an integer pixel shift set and a fractional pixel shift set;
identify a texture coherence value of at least one of the plurality of low-resolution images;
select a non-directional filter set or a directional filter set corresponding to the plurality of pixels from among a plurality of pre-stored filter sets including a filter weight value applied to the pixels, based on the identified texture coherence value and the fractional pixel shift set; and
obtain a high-resolution image with respect to the single scene, based on the plurality of low-resolution images, the selected filter set, and the integer pixel shift set.

11. The apparatus of claim 10, wherein the at least one processor is further configured to execute the one or more instructions to:
select fractional shift values, each corresponding to a value within a pre-set range of fractional shift values; and
generate the fractional pixel shift set by combining the selected fractional shift values.

12. The apparatus of claim 10, wherein the at least one processor is further configured to execute the one or more instructions to:
select the filter set corresponding to the plurality of pixels from among the plurality of pre-stored filter sets, based on the fractional pixel shift set and a pre-set regularizer.

13. The apparatus of claim 10, wherein a number of the plurality of pre-stored filter sets is determined based on at least one pixel shift coincidence property of the plurality of pixels included in the coinciding portions.

14. The apparatus of claim 10, wherein the at least one processor is further configured to execute the one or more instructions to:
determine a noise-reduction parameter with respect to the pixels of the plurality of low-resolution images, the noise-reduction parameter including a noise model, a size of the coinciding portions, a search radius with respect to adjacent image portions, and a relationship between a pixel brightness and a pixel noise standard deviation;
obtain a texture-dependent noise-reduction coefficient based on a change in brightness of the pixels of the plurality of low-resolution images;
determine an estimated value of the pixel noise standard deviation, using a relationship between the pixel brightness and the pixel noise standard deviation, the texture-dependent noise-reduction coefficient, and a noise-reduction coefficient; and
obtain a plurality of noise-reduced low-resolution images by performing a three-dimensional noise-reduction operation on the plurality of low-resolution images, based on the noise-reduction parameter and the estimated value of the pixel noise standard deviation,
wherein the pixel shift set is obtained from the plurality of noise-reduced low-resolution images.

15. The apparatus of claim 14, wherein the at least one processor is further configured to execute the one or more instructions to:
generate a fallback map indicating a fidelity of pixel shift values included in the pixel shift set, based on the pixel shift set;
determine a texture direction of the plurality of noise-reduced low-resolution images; and
select the filter set corresponding to the plurality of pixels from among the plurality of pre-stored filter sets, based on the fallback map, the fractional pixel shift set, and the texture direction.

16. The apparatus of claim 10, wherein the plurality of low-resolution images with respect to the single scene comprise RGB images.

17. The apparatus of claim 16, wherein the at least one processor is further configured to execute the one or more instructions to:
convert the high-resolution image having a format of a RGB image into a YUV image;
obtain, with respect to the YUV image, a pixel standard deviation map with respect to channel Y;
perform cross bilinear filtering on channel U and channel V, based on a reference channel obtained by performing smoothing on the pixel standard deviation map; and
obtain the high-resolution image post-processed by converting the YUV image, to which the cross bilinear filtering is applied, into the format of the RGB image.

18. A non-transitory computer-readable recording medium having embodied thereon a program for executing the method of claim 1.

* * * * *